United States Patent
Riazuddin et al.

(10) Patent No.: US 12,553,027 B2
(45) Date of Patent: Feb. 17, 2026

(54) GENERATION AND CRYOPRESERVATION OF PLURIPOTENT STEM CELL-DERIVED CLINICAL GRADE CORNEAL ENDOTHELIAL CELLS

(71) Applicant: The Johns Hopkins University, Baltimore, MD (US)

(72) Inventors: S. Amer Riazuddin, Baltimore, MD (US); John Gottsch, Baltimore, MD (US); Shahid Khan, Baltimore, MD (US); Muhammad Ali, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 941 days.

(21) Appl. No.: 17/413,529

(22) PCT Filed: Dec. 12, 2019

(86) PCT No.: PCT/US2019/065907
§ 371 (c)(1),
(2) Date: Jun. 11, 2021

(87) PCT Pub. No.: WO2020/123769
PCT Pub. Date: Jun. 18, 2020

(65) Prior Publication Data
US 2022/0025325 A1    Jan. 27, 2022

Related U.S. Application Data

(60) Provisional application No. 62/778,862, filed on Dec. 12, 2018.

(51) Int. Cl.
*C12N 5/079* (2010.01)
*A01N 1/125* (2025.01)
(Continued)

(52) U.S. Cl.
CPC .......... *C12N 5/0621* (2013.01); *A01N 1/125* (2025.01); *A61K 35/30* (2013.01); *A61P 27/02* (2018.01);
(Continued)

(58) Field of Classification Search
None
See application file for complete search history.

(56) References Cited

U.S. PATENT DOCUMENTS

2014/0370007 A1* 12/2014 McCabe ................ A61K 35/30
424/278.1

FOREIGN PATENT DOCUMENTS

EP    2765188 A1    8/2014
WO    2017/141926 A1    8/2017
(Continued)

OTHER PUBLICATIONS

Ali et al., Invest. Ophthalmol. Vis. Sci. 59(6): 2437-2444 (May 2018).*
(Continued)

*Primary Examiner* — Erin M. Bowers
(74) *Attorney, Agent, or Firm* — Peter F. Corless; Fox Rothschild LLP

(57) ABSTRACT

Human embryonic stem cell (hESC)- and induced pluripotent stem cell (iPSC)-derived clinical-grade corneal endothelial cells (CECs) generation and cryopreservation through the neural crest cell (NCC) lineage using peripheral blood as a donor source and hESCs maximizes the availability of these vital cells for treating the corneal endothelial disease as an alternative to donor corneas for corneal endothelium (CE) transplantations and other applications.

20 Claims, 11 Drawing Sheets

(51) Int. Cl.
     *A61K 35/30*     (2015.01)
     *A61P 27/02*     (2006.01)
(52) U.S. Cl.
     CPC ...... *C12N 2506/02* (2013.01); *C12N 2506/03* (2013.01); *C12N 2506/11* (2013.01)

(56) References Cited

FOREIGN PATENT DOCUMENTS

| WO | 2017/190136 | A1 | 11/2017 |
|----|-------------|----|---------|
| WO | WO 2017/190136 | * | 11/2017 |

OTHER PUBLICATIONS

Pennington et al., Stem Cells Translational Medicine 4: 165-177 (2015).*

Ali et al., "Generation and Proteome Profiling of PBMC-Originated, iPSC-Derived Corneal Endothelial Cells," Invest Ophthalmol Vis Science, 59:6, pp. 2437-2444, 2018.

Lee et al., "Single Transcription Factor Conversion of Human Blood Fate to NPCs with CNS and PNS Developmental Capacity," Cell Reports, 11:9, pp. 1367-1376, 2015.

International Search Report and the Written Opinion from corresponding PCT Application No. PCT/US2019/065907 dated Mar. 9, 2020, 8 pages.

Jiagang J. Zhao et al: "Generation of Human Corneal Endothelial Cells via In Vitro Ocular Lineage Restriction of Pluripotent Stem Cells", Investigative Opthalmology & Visual Science, vol. 57, No. 15, Dec. 21, 2016 (Dec. 21, 2016), pp. 6878-6884.

Mohit Parekh et al: "Concise Review: An Update on the Culture of Human Corneal Endothelial Cells for Transplantation: Corneal Endothelial Cell Culture", Stem Cells Translational Medicine, vol. 5, No. 2, Dec. 23, 2015.(Dec. 23, 2015), pp. 258-264.

Ali Muhammad et al: "Comparative transcriptome analysis of hESCÂ•and iPSC-derived corneal endothelial cells", Experimental Eye Research, vol. 176, Sep. 6, 2018 (Sep. 6, 2018), pp. 252-257.

Kathryn L. McCabe et al: "Efficient Generation of Human Embryonic Stem Cell-Derived Corneal Endothelial Cells by Directed Differentiation", PLOS ONE, vol. 10, No. 12, Dec. 21, 2015.

* cited by examiner

GENERATION AND CRYOPRESERVATION OF PLURIPOTENT STEM CELL-DERIVED CLINICAL GRADE CORNEAL ENDOTHELIAL CELLS

CROSS-REFERENCE TO RELATED APPLICATIONS

This application is a National Stage Application filed under 35 U.S.C. § 371, of International Patent Application No PCT/US2019/065907, filed on Dec. 12, 2019, which claims the benefit of and priority to U.S. Provisional Application No. 62/778,862, filed on Dec. 12, 2018. The entire contents of each of these application are incorporated herein by reference in their entirety.

FIELD OF THE INVENTION

Embodiments are directed to the generation and cryopreservation of clinical-grade corneal endothelial cells from the peripheral blood mononuclear cell (PBMC)-originated, induced pluripotent stem cells (iPSCs) and human embryonic stem cells (hESCs) and uses thereof.

BACKGROUND

The cornea is the outermost, transparent layer of the eye. It is composed of five layers: epithelium, Bowman's membrane, stroma, Descemets membrane, and endothelium.[1] The corneal endothelium (CE), is a monolayer of hexagonal cells which is critical in maintaining corneal clarity by mediating hydration through barrier and pump functions.[2] The CE cell density is approximately 2500 cells/mm$^2$ in adult CE.[3] Corneal endothelial dystrophies and surgical trauma are the major factors that contribute to loss of corneal endothelial cells (CECs) and a decrease in CE cell density. The physiological functioning of the CE is undermined below 500 cells/mm$^2$ cell density resulting in corneal edema and loss of vision.[3]

Fuchs endothelial corneal dystrophy (FECD) is the leading cause of corneal transplantation performed both in the US and worldwide each year.[4,5] Although keratoplasty has been successful at visual rehabilitation, graft rejection and lack of suitable donor tissue for transplantation continue to be impediments to reduce worldwide corneal blindness.

SUMMARY

Embodiments of the invention are directed, inter alia to the generation and cryopreservation of the peripheral blood mononuclear cell (PBMC)-originated, induced pluripotent stem cell (iPSC)- and human embryonic stem cell (hESC)-derived clinical-grade corneal endothelial cells (CECs) and their uses thereof.

In certain embodiments, a method of producing corneal endothelial cells (CECs) comprises isolating peripheral blood mononuclear cells (PBMCs) from a biological sample, reprograming the PBMCs to induce pluripotency expressing the pluripotent markers NANOG, OCT4, SOX2, SSEA4, TRA-1-60 and differentiation of the pluripotent stem cells including induced pluripotent stem cells (iPSCs) and human embryonic stem cells (hESCs) to produce corneal endothelial cells (CECs). In certain embodiments, the step of culturing the cells comprises culturing the iPSCs and hESCs on human recombinant protein, for example, Vitronectin (VTN-N) using Essential 8 medium. In certain embodiments, the differentiating cells (iPSCs and hESCs) express neural crest markers, NGFR, SOX10 or combinations thereof. In certain embodiments, the corneal endothelium (CE)-associated markers comprise AQP1, COL4A1, COL4A3, COL8A1, COL8A2, FOXC1, SLC16A3 or combinations thereof. In certain embodiments, the matured CECs are identified by markers comprising AQP1, COL4A3, COL8A2, SLC16A3 or combinations thereof.

In certain embodiments, a method of preventing or treating corneal associated diseases or disorders, comprising producing corneal endothelial cells (CECs) from human embryonic stem cells (hESCs) and peripheral blood mononuclear cell (PBMC)-originated, induced pluripotent stem cells (iPSCs) and transplanting the CECs in the cornea of a subject in need of some treatment. In certain embodiments, corneal disease or disorder comprises: inherited diseases or disorders, infection, wounds, inflammatory diseases, autoimmune diseases, dry eye, dystrophies or combinations thereof. In certain embodiments, corneal disease or disorder comprises: Fuchs endothelial corneal dystrophy (FECD), lattice dystrophy, keratoconus, herpes virus infections, varicella-zoster virus infections, iridocorneal endothelial syndrome (ICE), pterygium, corneal ulcers, corneal abrasion, or bullous keratopathy.

In certain embodiments, a reprogramming method for producing induced pluripotent stem cells (iPSCs) comprises a) infection of cells by reprogramming viral particles expressing c-MYC, KLF4, OCT3/4, SOX2 or combinations thereof; b) culturing infected cells in a medium supporting their expansion; c) isolating iPSC colonies. In certain embodiments, iPSC colonies expressing pluripotent markers are selected and expanded. In certain embodiments, the pluripotent markers comprise NANOG, OCT4, SOX2, SSEA4, TRA-1-60 or combinations thereof. In certain embodiments, the cells expressing pluripotent markers are cultured on human recombinant Vitronectin (VTN-N) using Essential 8 medium. In certain embodiments, the iPSCs and human embryonic stem cells (hESCs) are confirmed by means comprising gene expression of pluripotent markers, protein expression of pluripotent markers, or combinations thereof.

In certain embodiments, the present invention further provides a method for stem cell therapy, which comprises the step of transplanting cell, wherein said cell is obtained by inducing differentiation of human embryonic stem cells (hESCs) and/or induced pluripotent stem cells (iPSCs) obtained by the aforementioned method using a somatic cell isolated and collected from a patient, into said patient. iPSCs prepared from somatic cells derived from healthy humans can be stored in an iPSC bank as a library of iPSCs, and one kind or more kinds of the iPSCs in the library can be used for preparation of somatic cells, tissues, or organs that are free of rejection by a patient to be subjected to stem cell therapy.

In certain embodiments, the present invention further provides a method for evaluating a physiological function or toxicity of a compound, a medicament, a poison or the like by using various cells obtained by inducing differentiation of induced pluripotent stem cells (iPSCs) obtained by the aforementioned method.

In certain embodiments, a composition comprises cryopreserved corneal endothelial cells (CECs) produced from human embryonic stem cells (hESCs) and peripheral blood mononuclear cell (PBMC)-originated induced pluripotent stem cells (iPSCs).

In certain embodiments, cryopreserved corneal endothelial cells (CECs) are contained in a vial. In certain embodiments, the cryopreserved corneal endothelial cells (CECs) are frozen in a cryopreservative composition or medium.

Other aspects are described infra.

Unless defined otherwise, all technical and scientific terms used herein have the same meaning as commonly understood by one of ordinary skill in the art to which the invention pertains. Although any methods and materials similar or equivalent to those described herein can be used in the practice for testing of the present invention, the preferred materials and methods are described herein. In describing and claiming the present invention, the following terminology will be used. It is also to be understood that the terminology used herein is for the purpose of describing particular embodiments only, and is not intended to be limiting.

The articles "a" and "an" are used herein to refer to one or to more than one (i.e., to at least one) of the grammatical object of the article. By way of example, "an element" means one element or more than one element. Thus, recitation of "a cell", for example, includes a plurality of the cells of the same type. Furthermore, to the extent that the terms "including", "includes", "having", "has", "with", or variants thereof are used in either the detailed description and/or the claims, such terms are intended to be inclusive in a manner similar to the term "comprising."

As used herein, the terms "comprising," "comprise" or "comprised," and variations thereof, in reference to defined or described elements of an item, composition, apparatus, method, process, system, etc. are meant to be inclusive or open-ended, permitting additional elements, thereby indicating that the defined or described item, composition, apparatus, method, process, system, etc. include those specified elements or, as appropriate, equivalents thereof and that other elements can be included and still fall within the scope/definition of the defined item, composition, apparatus, method, process, system, etc.

As used herein, "culture medium" or "cultivation medium" refers broadly to any liquid formulation designed to support the growth of cells. When referring to a formulation designed for cell maintenance and growth, the term "cell culture medium" is used. In the art, expressions such as induction medium, growth medium, differentiation medium, etc. can be considered as subspecies to the general expression culture medium. A man skilled in the art is familiar with the basic components necessary to maintain and nourish the living subjects in or on the culture medium, and commercial basic media are widely available. Typically such basic components are referred to as "basal medium", which contains necessary amino acids, minerals, and organic compounds. Generally, it can be obtained from biological sources, such as serum or be combined from isolated and pure ingredients. If desired, the basal medium may be supplemented with substances contributing to special features or functions of culture medium. Non-limiting examples of suitable basal media to be used in the present cell culture media of various embodiments include knockout serum replacement, Dulbecco's Modified Eagle's Medium (DMEM)/F-12 medium and any combinations thereof.

"Differentiation" or "differentiate" or "differentiating" as used herein refers to the developmental process of lineage commitment. A "lineage" refers to a pathway of cellular development, in which precursor or progenitor cells undergo progressive physiological changes to become a specified cell type having a characteristic function (e.g., nerve cell, muscle cell, T cell, B cell, erythrocytes, or endothelial cell). Differentiation occurs in stages, whereby cells gradually become more specific until they reach full maturity, which is also referred to as "terminal differentiation." A terminally differentiated cell is a cell that has committed to a specific lineage and has reached the end stage of differentiation (i.e., a cell that has fully matured).

The terms "patient" or "individual" or "subject" are used interchangeably herein and refer to a mammalian subject to be treated, with human patients being preferred. In some cases, the methods of the invention find use in experimental animals, in the veterinary application, and in the development of animal models for disease, including, but not limited to rodents including i.e mice, rats, rabbits, and primates.

"Prevent", "preventing", "prevention" and the like refer to a course of action (such as administering differentiated stem cells produced by the methods disclosed herein) initiated in a manner (e.g., prior to the onset of a disease, disorder, condition or symptom thereof) so as to prevent, suppress, inhibit or reduce, either temporarily or permanently, a subject's risk of developing a disease, disorder, condition or the like (as determined by, for example, the absence of clinical symptoms) or delaying the onset thereof, generally in the context of a subject predisposed to having a particular disease, disorder or condition. In certain instances, the terms also refer to slowing the progression of the disease, disorder or condition or inhibiting progression thereof to a harmful or otherwise undesired state. "In need of prevention" as used herein refers to a judgment made by a physician or other caregiver that a subject requires or will benefit from preventive care. This judgment is made based on a variety of factors that are in the realm of a physician's or caregiver's expertise.

As used herein, "stem cell" refers to a mammalian cell that can undergo self-renewal and can differentiate into multiple cell types. The term as used herein encompasses naturally occurring and non-naturally occurring pluripotent (for example human embryonic stem cells and genetically modified induced pluripotent stem cells) and multipotent stem cells unless otherwise stated. Thus, the term stem cells covers pluripotent stem cells i.e., induced pluripotent stem cells (iPSCs) and embryonic stem cells (ESCs); multipotent stem cells i.e., hematopoietic stem cells (HSCs), mesenchymal stem cells (MSCs), neuronal stem cells (NSCs), and epidermal stem cell; and genetically modified variants of each of the aforementioned stem cell type. iPSCs have ESC-like morphology and express key pluripotency markers known by one of ordinary skill in the art, including but not limited to Alkaline Phosphatase, SSEA1, SSEA4, SOX2, OCT3/4, NANOG, TRA160, TRA181, TDGF1, DNMT3B, FOXD3, GDF3, CYP26A1, TERT, and ZFP42.

As used herein, a "TGFβ inhibitor" refers to an agent that reduces the activity of TGFβ receptor by directly binding to a TGFβ receptor or by modulating the activity of any member of TGFβ receptor pathway such as a SMAD, Activin, Nodal, bone morphogenetic protein (BMP), growth and differentiation factor (GDF), or Mullerian inhibitory factor (MIF) or substances that promote the ubiquitination and degradation of above proteins.

To "treat" a disease as the term is used herein, means to reduce the frequency or severity of at least one sign or symptom of a disease or disorder experienced by a subject.

As used herein the term "xeno-free" refers to the absence of any foreign material or component derived from animals. Thus, in the case of human cell culture, this refers to conditions free from non-human animal components. In other words, when xeno-free conditions are desired for the production of eye precursor cells, or any cells maturated therefrom, for human use, embryonic stem cells (ESCs) or induced pluripotent stem cells (iPSCs) are selected to be of human origin.

DETAILED DESCRIPTION

Figure 1:
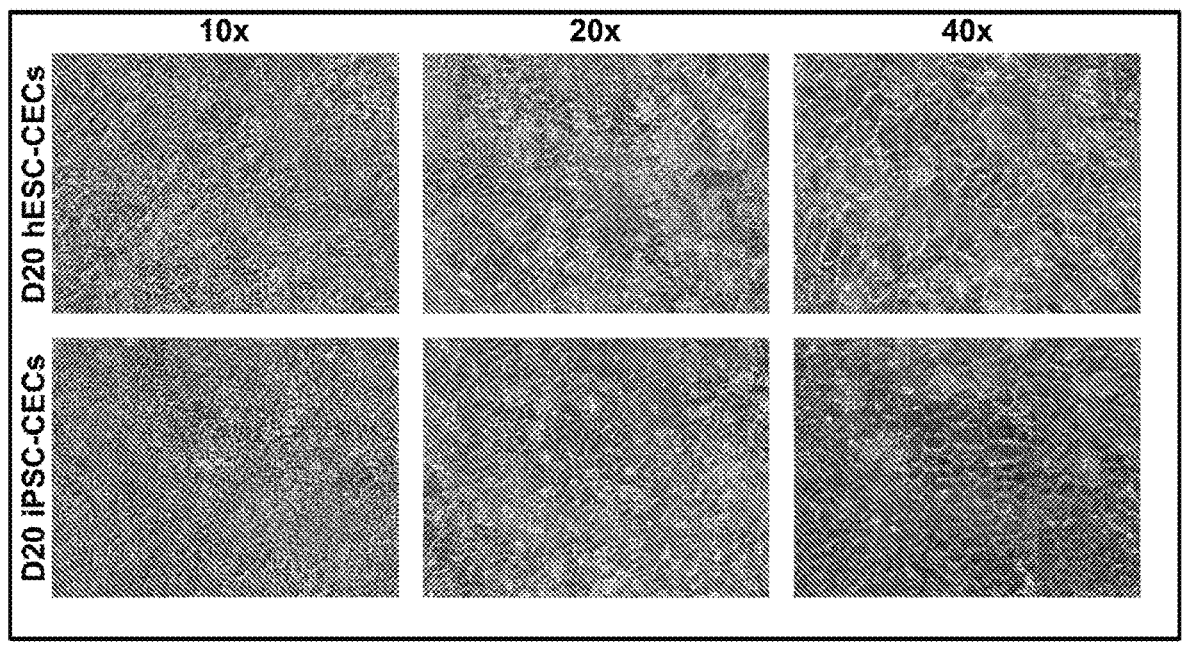
FIG. 1 is a series of images showing the generation of corneal endothelial cells (CECs) from H9 human embryonic stem cells (hESCs) and human peripheral blood mononuclear cell (PBMC)-originated, induced pluripotent stem cells (iPSCs). Phase contrast microscopy at various magnifications during CECs differentiation illustrating CEC-like hexagonal/polygonal morphology at day 20 (D20).
Figure 2:
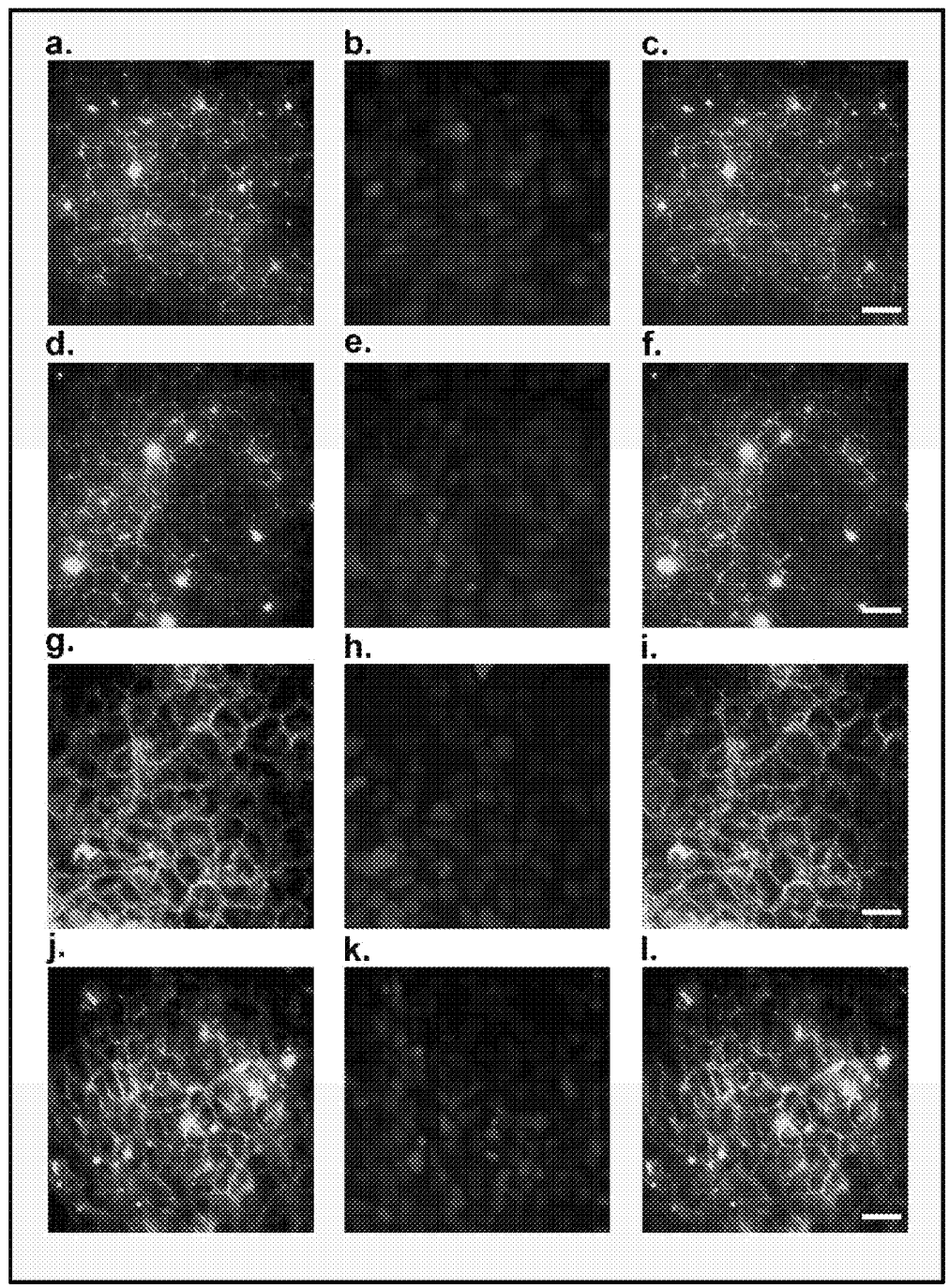
FIG. 2 is a series of images showing the characterization of H9 human embryonic stem cell (hESC)- and human peripheral blood mononuclear cell (PBMC)-originated, induced pluripotent stem cell (iPSC)-derived corneal endothelial cells (CECs) by immunocytochemistry. a-c Immunostaining for zona occludens-1 (ZO-1, a tight junction protein) of hESC-derived CECs. d-f. Immunostaining for ZO-1 of human PBMC-originated, iPSC-derived CECs. g-i. Immunostaining for N-cadherin of hESC-derived CECs. j-l. Immunostaining for N-cadherin of PBMC-originated, iPSC-derived CECs. Cell nuclei were counterstained with DAPI. Images were captured using 60× magnification. The scale bars represent 10 µm.
Figure 3:
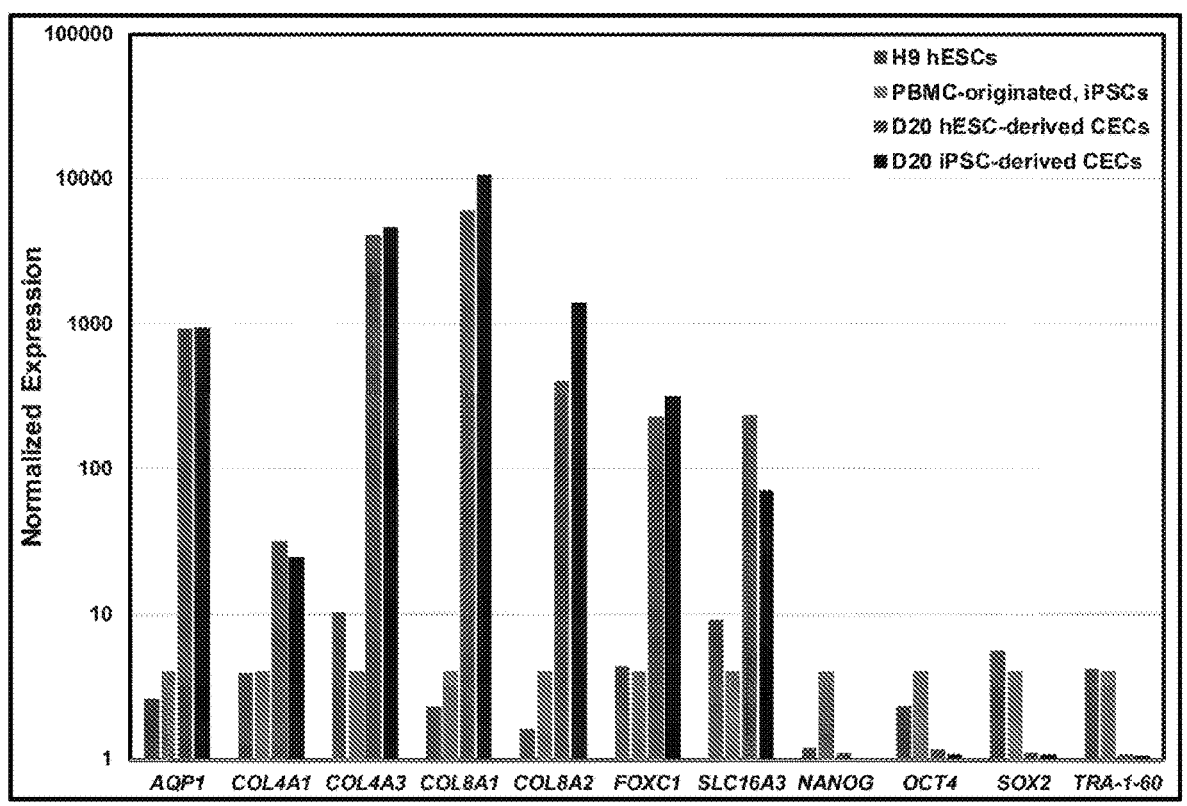
FIG. 3 is a graph showing the gene expression analysis of corneal endothelium (CE)- and pluripotency-associated markers during differentiation of human embryonic stem cells (hESCs) and human peripheral blood mononuclear cell (PBMC)-originated, induced pluripotent stem cells (iPSCs) into corneal endothelial cells (CECs). The expression level of seven CE-associated markers (AQP1, COL4A1, COL4A3, COL8A1, COL8A2, FOXC1, SLC16A3) and four pluripotent markers i.e. NANOG, OCT4, SOX2, TRA-1-60 were analyzed by quantitative real-time PCR (qRT-PCR) in hESCs, hESC-derived CECs and PBMC-originated, iPSC-derived CECs on day 20 (D20). Note: Expression of all markers is normalized against GAPDH, and all values are relative to the respective expression of hESCs.
Figure 4:
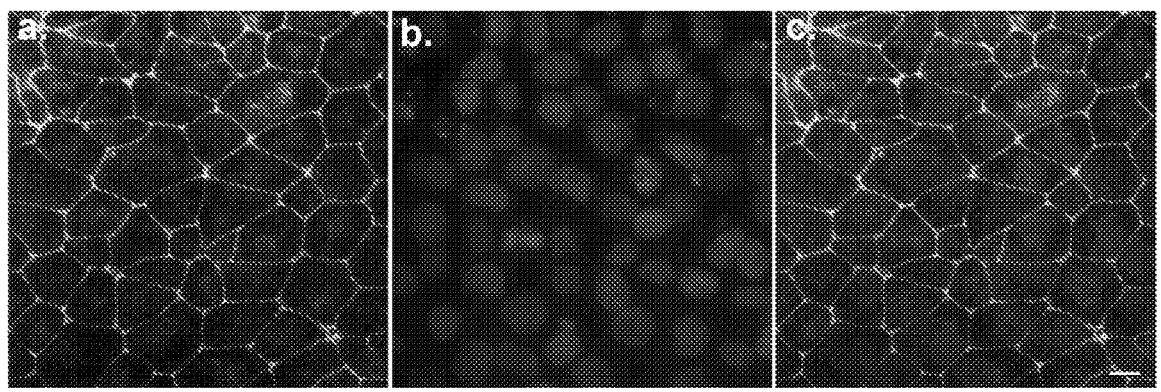
FIG. 4 is a series of images showing characterization by immunohistochemical examination of H9 human embryonic stem cell (hESC)-derived corneal endothelial cells (CECs) generated under feeder-free and xeno-free conditions. a-c Immunostaining for zona occludens-1 (ZO-1, a tight junction protein) of hESC-derived CECs.
Figure 5:
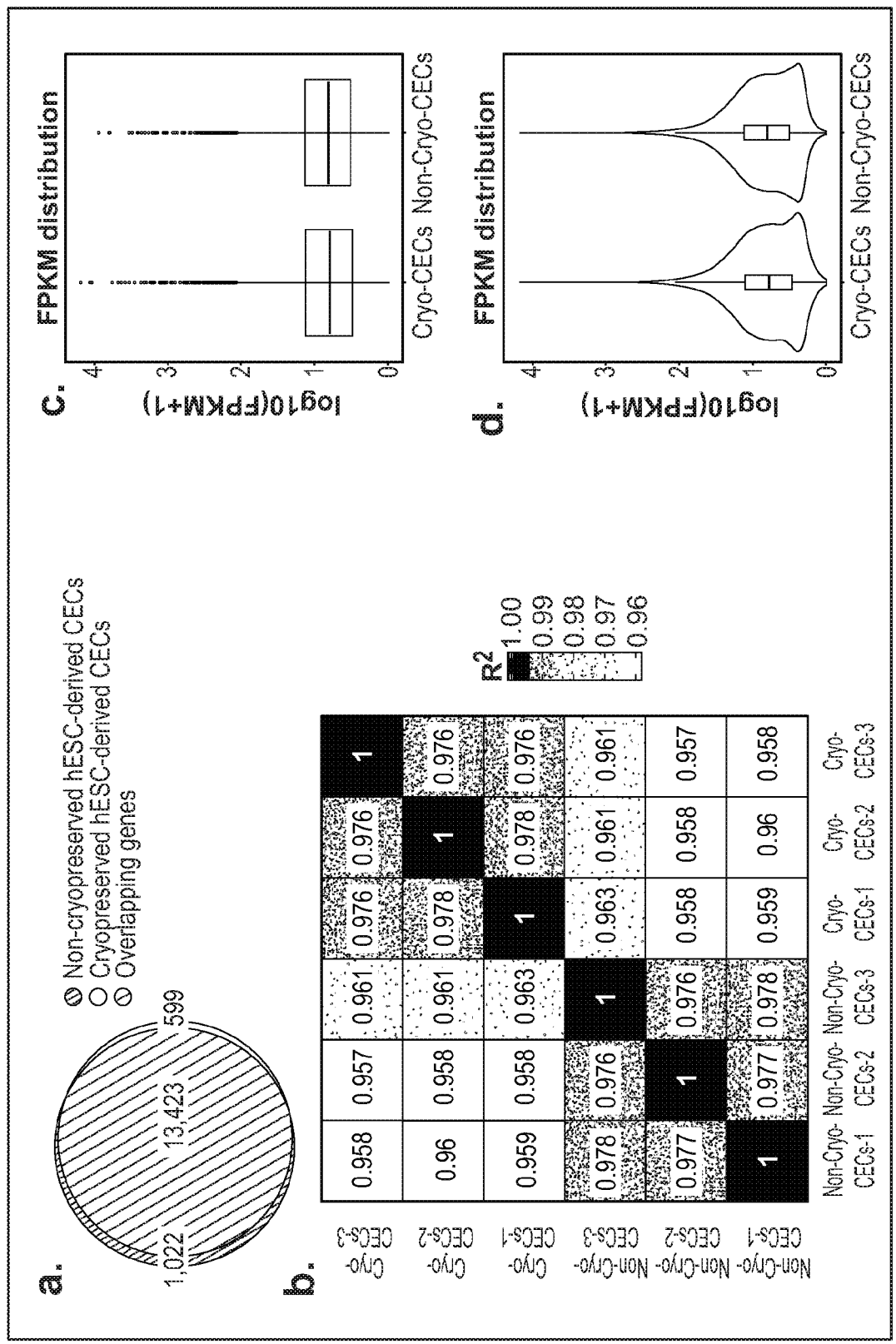
FIG. 5 illustrates the results of comparative analysis of non-cryopreserved and the cryopreserved H9 human embryonic stem cell (hESC)-derived corneal endothelial cells (CECs) by next-generation RNA-sequencing (RNA-Seq). a. Venn diagram illustrating the overlap between the transcriptome datasets of non-cryopreserved and cryopreserved hESC-derived CECs. b. A Pearson correlation representing the normalized expression of non-cryopreserved and cryopreserved hESC-derived CECs datasets that illustrate a high correlation among both datasets (Pearson correlation R=0.975). c. Box plot displaying the range of variation within non-cryopreserved and cryopreserved hESC-derived CECs transcriptome datasets. d. Violin plot representing the expression intensity distribution of the genes within non-cryopreserved and cryopreserved hESC-derived CECs transcriptome datasets.
Figure 6:
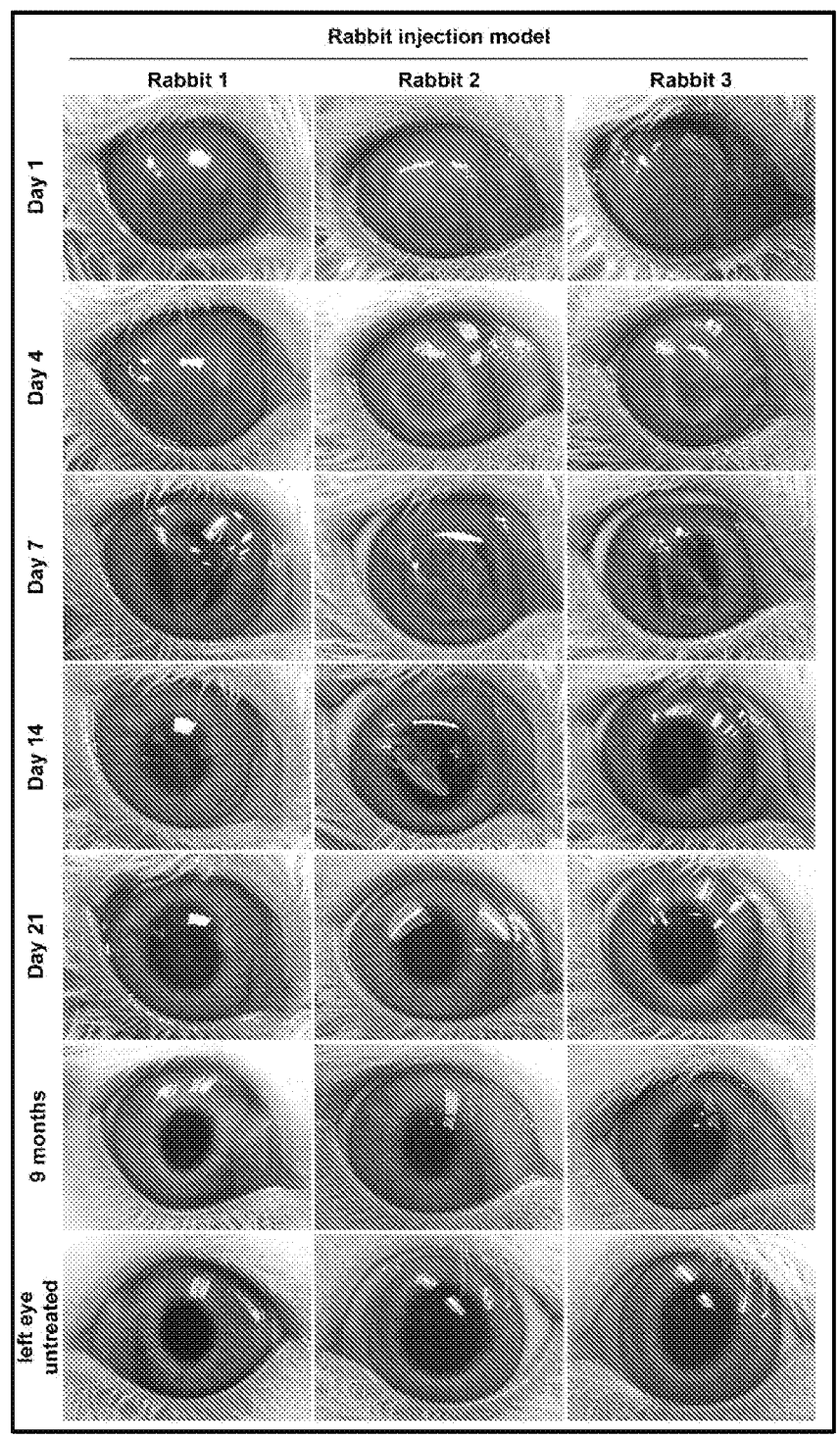
FIG. 6 is a series of images showing regenerated corneal endothelium (CE) in rabbits after injection of cryopreserved human embryonic stem cell (hESC)-derived corneal endothelial cells (CECs). Representative photographs of rabbit eyes injected with cryopreserved hESC-derived CECs on days 1, 4, 7, 14, 21 and 9-month time points. The right eyes exhibiting transparent corneas following the injection of cryopreserved hESC-derived CECs into the anterior chamber, similar to the left untreated control eyes.
Figure 7:
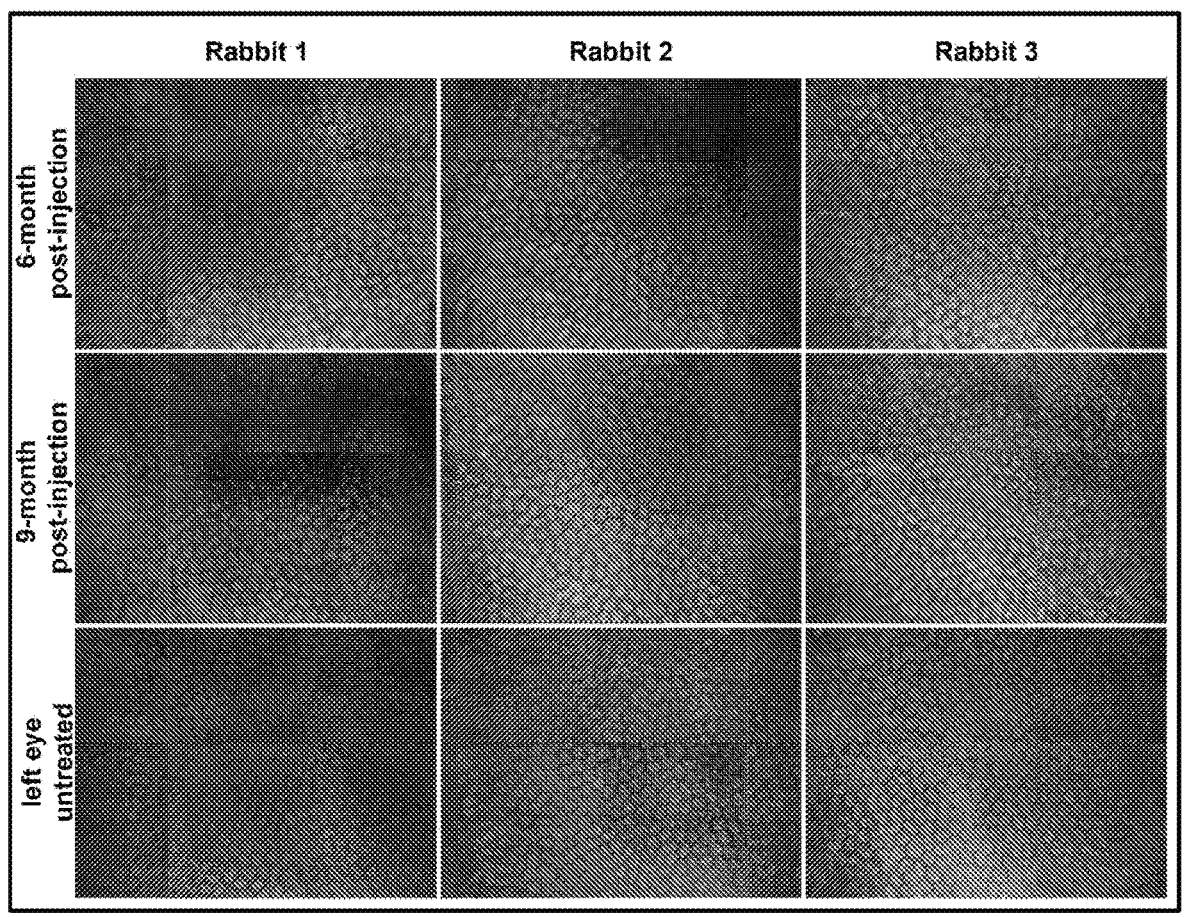
FIG. 7 is a series of images showing the evaluation of regenerated corneal endothelium (CE) in rabbits after injection of cryopreserved human embryonic stem cell (hESC)-derived corneal endothelial cells (CECs). Regenerated CE was evaluated at 6- and 9-month post-injection using a confoscan4 scanning microscope. The injected eyes exhibit nearly similar CEC density and shape to the left untreated eye.
Figure 8:
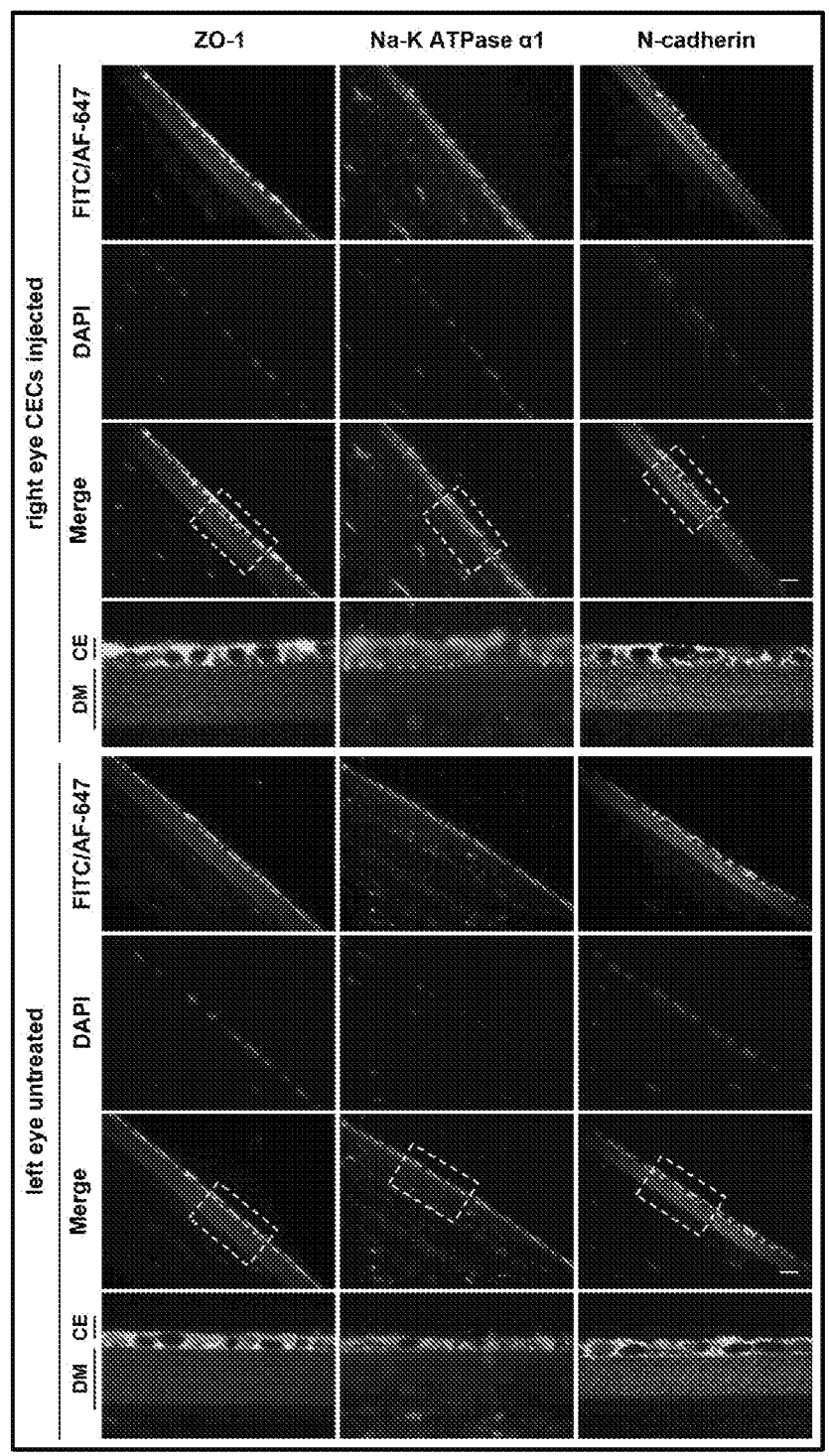
FIG. 8 is series of images showing characterization by immunohistochemical examination of regenerated corneal endothelium (CE) after injection of cryopreserved human embryonic stem cell (hESC)-derived corneal endothelial cells (CECs) in rabbits at 9 months post-injection Immunostaining for zona-occludens-1 (ZO-1), ATPase sodium/potassium subunit alpha1 ($Na^+/K^+$ ATPase $\alpha$1) and N-cadherin exhibiting similar expression patterns in the regenerated CE and left untreated control CE. Note: Cell nuclei were counterstained with DAPI. The images are captured using 60× magnification, and the scale bar represents 10 µm.
Figure 9:
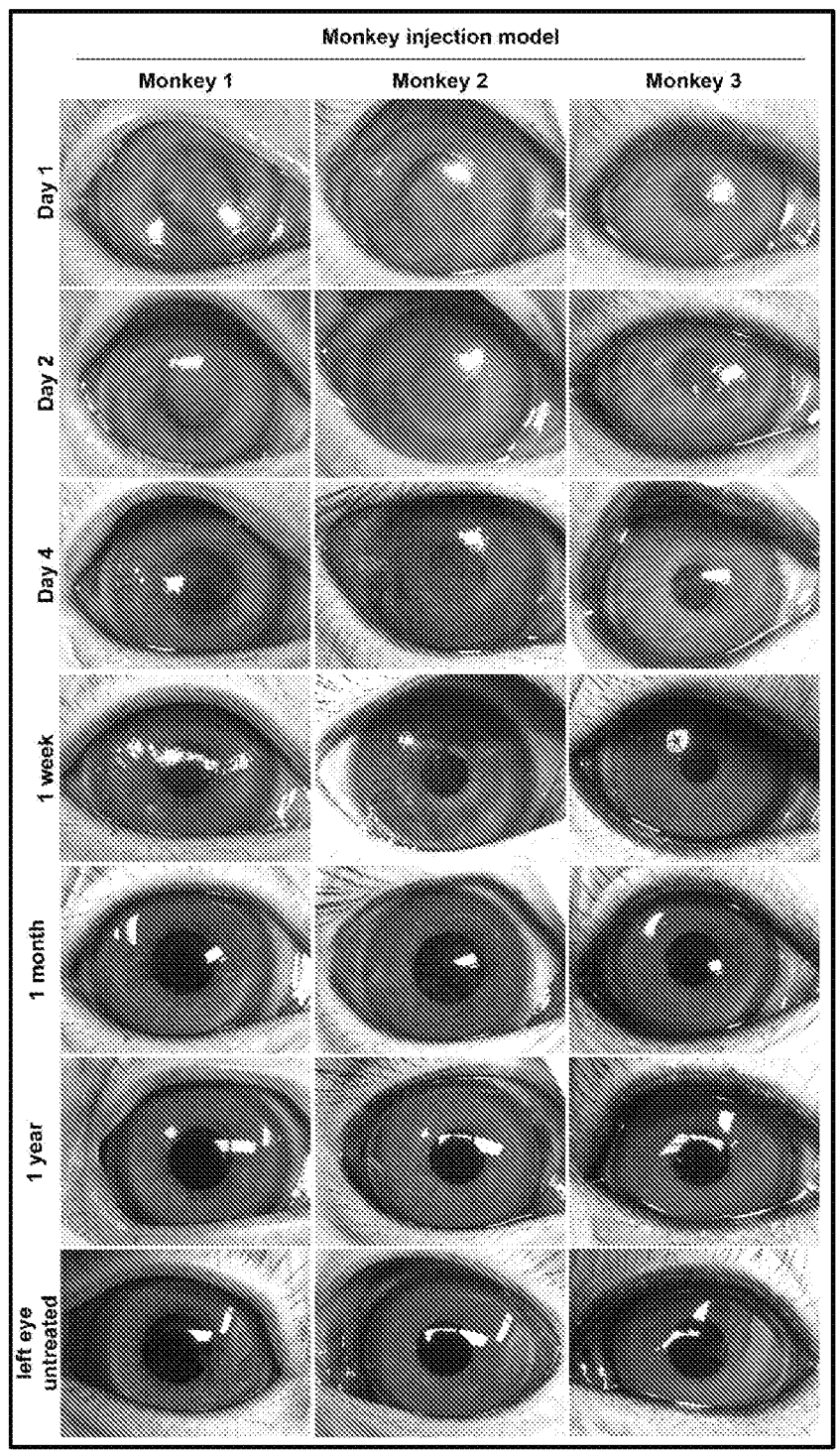
FIG. 9 is a series of images showing regenerated corneal endothelium (CE) in monkeys after injection of cryopreserved human embryonic stem cell (hESC)-derived corneal endothelial cells (CECs). Representative photographs of the monkey eyes injected with hESC-derived CECs on days 1, 2, 4 and on 1 week, 1 month and 1 year time points. The right eyes exhibiting transparent corneas following the injection of cryopreserved hESC-derived CECs into the anterior chamber, similar to the left untreated control eyes.
Figure 10:
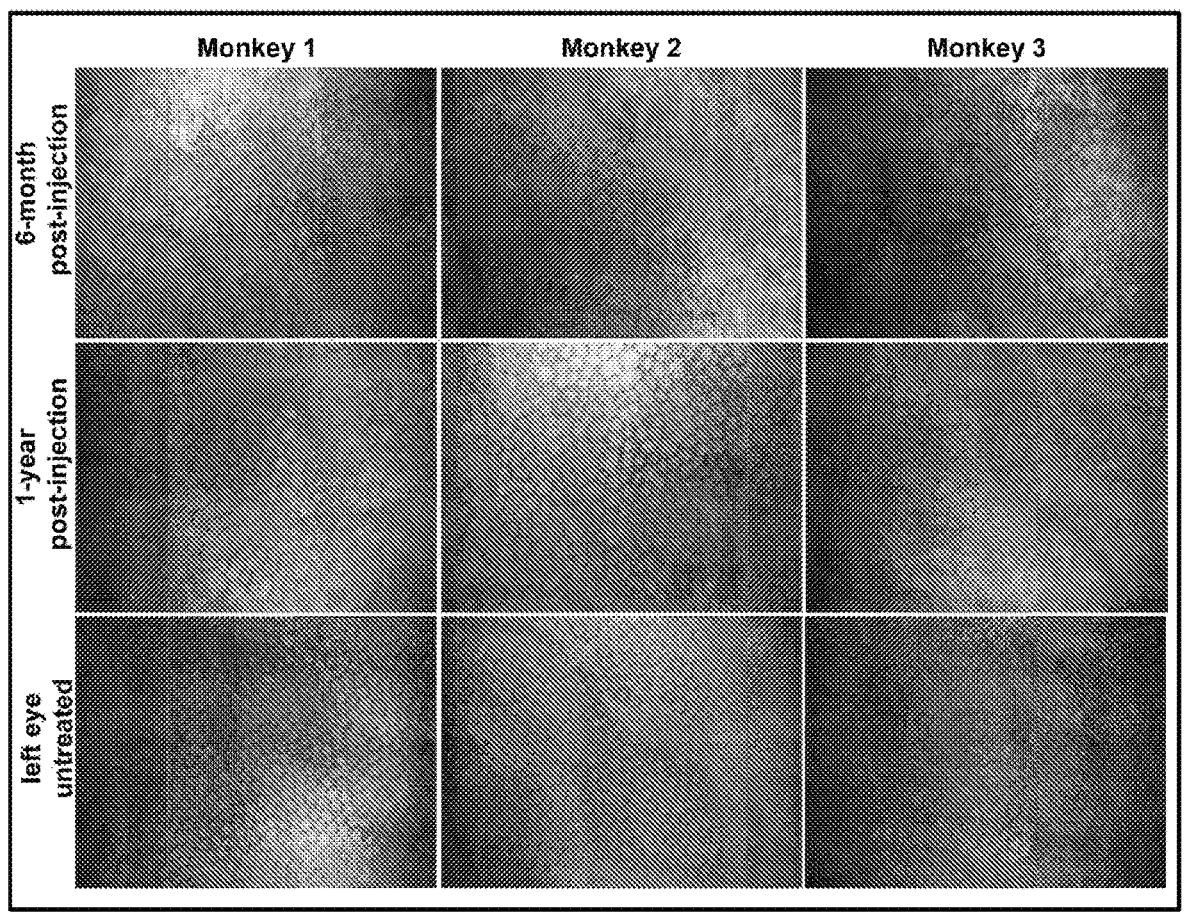
FIG. 10 is a series of images showing the evaluation of regenerated conical endothelium (CE) in monkeys after injection of cryopreserved human embryonic stem cell (hESC)-derived corneal endothelial cells (CECs). Regenerated CE was evaluated at 6-month and 1-year post-injection using a confoscan4 scanning microscope. The injected eyes exhibit nearly similar CEC density and shape to the left untreated eye.
Figure 11:
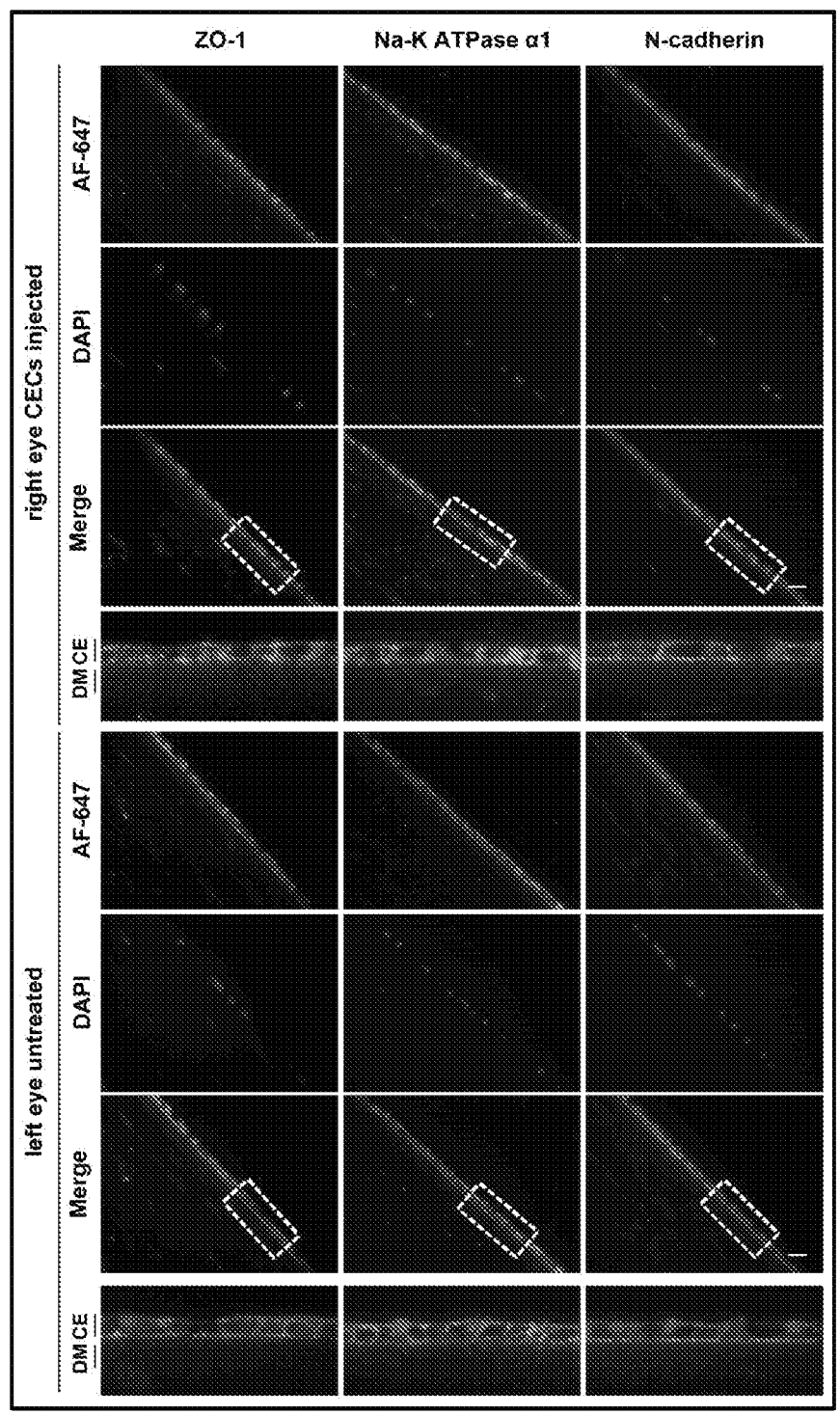
FIG. 11 is images showing characterization by immunohistochemical examination of regenerated conical endothelium (CE) after injection of cryopreserved human embryonic stem cell (hESC)-derived conical endothelial cells (CECs) in at 1-year post-injection. Immunostaining for zona-occludens-1 (ZO-1), ATPase sodium/potassium subunit alpha1 ($Na^+/K^+$ ATPase $\alpha$1) and N-cadherin exhibiting similar expression patterns in the regenerated CE and left untreated control CE. Note: Cell nuclei were counterstained with DAPI. The images are captured using 60× magnification, and the scale bar represents 10 µm.

The invention is based in part on the development of conical endothelial cells (CECs) from human embryonic stem cells (hESCs) and peripheral blood mononuclear cell (PBMC)-originated, induced pluripotent stem cells (iPSCs). In brief, hESCs and iPSCs were differentiated into CECs through the neural crest cells (NCCs). The morphology of differentiating hESCs and iPSCs were examined at regular intervals by phase contrast microscopy. In parallel, the expression of pluripotent and corneal endothelium (CE)-associated markers was investigated by quantitative real-time PCR (qRT-PCR). The hESC- and iPSC-derived CECs were tightly adherent, exhibiting a hexagonal-like shape, one of the cardinal characteristics of CECs. The CE-associated markers expressed at significantly higher levels in hESC- and iPSC-derived CECs at day 20 compared to their respective levels in hESCs. Importantly, only residual expression levels of pluripotency markers were detected in hESC- and human induced pluripotent stem cell (iPSC)-derived CECs.

Human Embryonic Stem Cells (hESCs)

Human embryonic stem cells (also known as hESCs) are a type of pluripotent stem cells.

Currently, pluripotent stem cells hold great promise in the field of regenerative medicine. Its objectives are to repair tissues altered by accident, diseases or aging. This represents a new therapeutic field with tremendous medical impact because it offers the possibility to treat and cure diseases currently without adequate treatment. Regenerative medicine applies to most medical domains and constitutes one of the most promising developments of the biotechnology industry. Ischemic, degenerative and/or aging-associated diseases are the major causes of mortality in the population of developed countries.

Human Induced Pluripotent Stem Cells (iPSCs)

Induced pluripotent stem cells (iPSCs) offer autologous cell sources for replacement cell therapy, to replace or regenerate tissues by autologous transplantation. Moreover, patient-specific iPSCs can serve as in vitro models for disease mechanism modeling and drug screening. The original set of reprogramming factors (also called Yamanaka factors) comprises the genes OCT4, SOX2, cMYC, and NANOG. More recently, some specific combinations including three of these factors were reported to also generate iPSCs. On the other hand, the human embryonic stem cells (hESCs) provide an unlimited allogenic cell source for therapeutic purposes.

Accordingly, in certain embodiments, a method of producing corneal endothelial cells (CECs) comprises isolating peripheral blood mononuclear cells (PBMCs) from a biological sample, reprograming the PBMCs with pluripotent factors, selecting and culturing the cells expressing the pluripotent markers and differentiation of these cells to producing corneal endothelial cells (CECs). In certain embodiments, reprogramming or pluripotent factors comprise c-MYC, KLF4, OCT3/4, SOX2 or combinations thereof. In certain embodiments, the step of culturing the cells with one or more differentiation factors comprises culturing the cells on a gelatinous protein coating.

In certain embodiments, the gelatinous protein comprises human recombinant Vitronectin protein. In certain embodiments, the media comprises Dulbecco's Modified Eagle's Medium (DMEM)/F-12 medium and knockout serum replacement or combinations thereof. In certain embodiments, the media comprises a TGF-beta inhibitor, a fibroblast growth factor or combinations thereof. These induction supplements enhance differentiation of pluripotent stem cells towards eye precursor cells and improve their further differentiation efficiency into clinically valuable eye cells, such as corneal endothelial precursor cells. In certain embodiments, the differentiating cultured cells express neural crest markers, corneal endothelium (CE)-associated markers or combinations thereof. In certain embodiments, neural crest markers comprise NGFR, SOX10 or combinations thereof. In certain embodiments, the CE-associated markers comprise AQP1, COL4A1, COL4A3, COL8A1, COL8A2, FOXC1, SLC16A3 or combinations thereof. In certain embodiments, the matured CECs are identified by markers comprising AQP1, COL4A3, COL8A2, SLC16A3 or combinations thereof.

Corneal Endothelium

The cornea is the outermost tissue of the eye that covers the anterior segment of the ocular tissue. The transparency of the cornea is essential for clear vision, and lack of conical transparency can result in conical edema, vision impairment, and eventually blindness. The endothelium is the innermost layer of the cornea, which is indispensable for the dynamic regulation of conical hydration. It is worth noting that, unlike other cells in the human body, corneal endothelial cells (CECs) damaged by disease and/or trauma are not repaired or replaced by the body. Nearly half of the corneal transplantations performed in the US each year are due to some form of the conical endothelial disease.

Accordingly, in certain embodiments, peripheral blood mononuclear cell (PBMC)-originated, induced pluripotent stem cell (iPSC)- and human embryonic stem cell (hESC)-derived clinical-grade conical endothelial cells (CECs) are produced and subsequently cryopreserved. In certain embodiments, the CECs are generated from human embryonic stem cells. Treatment of patients using, in certain embodiments, autologous somatic cells, e.g. PBMCs, allows for personalized medicine and establishes a "patient-specific" therapeutic strategy to generate a renewable supply of CECs for corneal endothelial dystrophies, reducing the dependency of both donor corneas and corneal transplantation. Alternatively, the use of human embryonic stem cells offers an unlimited allogenic supply of CECs for corneal endothelial dysfunctions.

The generation of corneal endothelial cells (CECs) using human embryonic stem cells (hESCs) or peripheral blood-derived induced pluripotent stem cells (iPSCs) through the neural crest cell (NCC) lineage maximizes the availability of these vital cells for treating the corneal endothelial diseases as an alternative to donor corneas for CE transplantations and other applications.

Corneal Diseases and Associated Disorders

Corneal Dystrophies. The term corneal dystrophy embraces a heterogeneous group of bilateral genetically determined non-inflammatory corneal diseases that are restricted to the cornea. Clinically, the corneal dystrophies can be divided into three groups based on the sole or predominant anatomical location of the abnormalities. Some affect primarily the corneal epithelium and its basement membrane or Bowman layer and the superficial corneal stroma (anterior corneal dystrophies), the corneal stroma (stromal conical dystrophies), or Descemets membrane and the corneal endothelium (posterior corneal dystrophies). Most corneal dystrophies have no systemic manifestations and present with variable shaped corneal opacities in a clear or cloudy cornea and they affect visual acuity to different degrees. Corneal dystrophies may have a simple autosomal dominant, autosomal recessive or X-linked recessive Mendelian mode of inheritance. Different corneal dystrophies are caused by mutations in the CHST6, KRT3, KRT12, PIP5K3, SLC4A11, TACSTD2, TGFBI, and UBIAD1 genes.

Like the other corneal dystrophies, those of the superficial cornea are genetically determined and usually inherited as Mendelian traits. The unique phenotypes of the vast majority of corneal dystrophies are caused by mutations in different specific genes. The phenotype of some corneal dystrophies result from mutations in different genes and different phenotypes may be the result of different mutations in the same gene. Mutations in four genes (KRT3, KRT12, TGFBI, and TACSTD2) are currently known to cause inherited diseases that are apparently limited to the superficial cornea.

Corneal stromal dystrophies. This group of corneal dystrophies includes macular corneal dystrophy (MCD), granular corneal dystrophy (GCD) type I, the lattice corneal dystrophies (LCD), Schnyder corneal dystrophy (SCD), fleck corneal dystrophy (FCD), congenital stromal corneal dystrophy (CSCD) and posterior amorphous corneal dystrophy (PACD).

Posterior corneal dystrophies. The group of the posterior corneal dystrophies includes Fuchs endothelial corneal dystrophy (FECD), posterior polymorphous corneal dystrophy (PPCD), congenital hereditary endothelial corneal dystrophy (CHED) and X-linked endothelial corneal dystrophy (XECD). These diseases are characterized by abnormalities of the corneal endothelium and Descemet membrane. In most of them, a defective active fluid transport by the corneal endothelium causes excessive edema of the corneal stroma and this impairs the clarity of the cornea and reduces visual acuity.

The prevalence of Fuchs endothelial corneal dystrophy (FECD) differs markedly in different parts of the world. It is common and the most prevalent corneal dystrophy in the USA, where it affects approximately 4% of the population over the age of 40 years. In the USA, FECD was a leading indication for penetrating keratoplasty and this surgical procedure accounted for 10-25% of all corneal transplants in different series. This is a significant number considering that the annual number of corneal transplants in the USA is >32,000.

Fuchs endothelial corneal dystrophy (FECD) is a slow progressing disease that usually affects both eyes and is slightly more common in women than in men. FECD is caused by the gradual deterioration of cells in the corneal endothelium (CE); the causes aren't well understood. Normally, these endothelial cells maintain a healthy balance of fluids within the cornea. Healthy endothelial cells prevent the cornea from swelling and keep the cornea clear. In Fuchs' dystrophy, the endothelial cells slowly die off and cause fluid buildup and swelling within the cornea. The cornea thickens and vision becomes blurred.

As the disease progresses, Fuchs endothelial corneal dystrophy (FECD) symptoms usually affect both eyes and include: Glare, which affects vision in low light; Blurred vision that occurs in the morning after waking and gradually improves during the day; Distorted vision, sensitivity to light, difficulty seeing at night, and seeing halos around light at night; Painful, tiny blisters on the surface of the cornea; A cloudy or hazy looking cornea.

Keratoconus. Keratoconus is a progressive thinning of the cornea. It is the most common corneal dystrophy in the U.S., affecting one in every 2,000 Americans. It is most prevalent in teenagers and adults in their 20s. Keratoconus causes the middle of the cornea to thin, bulge outward, and form a rounded cone shape. This abnormal curvature of the cornea can cause double or blurred vision, nearsightedness, astigmatism, and increased sensitivity to light. A small number of people with keratoconus may develop severe corneal scarring or become unable to tolerate a contact lens. For these people, a corneal transplant may become necessary.

Iridocorneal Endothelial Syndrome (ICE). ICE is more common in women and usually develops between ages 30-50. ICE has three main features: visible changes in the iris, swelling of the cornea and glaucoma.

Iridocorneal endothelial syndrome (ICE) is usually present in only one eye. It is caused by the movement of endothelial cells from the cornea to the iris. This loss of cells from the cornea leads to corneal swelling and distortion of the iris and pupil. This cell movement also blocks the fluid outflow channels of the eye, which causes glaucoma. There is no treatment to stop the progression of ICE, but the glaucoma is treatable. If the cornea becomes so swollen that vision is significantly impaired, a corneal transplant may be necessary.

Bullous Keratopathy. Bullous keratopathy is caused by edema of the cornea, resulting from the failure of the corneal endothelium to maintain the normally dehydrated state of the cornea. Most frequently, it is due to Fuchs endothelial corneal dystrophy (FECD) or corneal endothelial trauma. Another frequent cause of bullous keratopathy is corneal endothelial trauma, which can occur during intraocular surgery (e.g., cataract removal) or after placement of a poorly designed or malpositioned intraocular lens implant. Bullous keratopathy after cataract removal is called pseudophakic (if an intraocular lens implant is present) or aphakic (if no intraocular lens implant is present) bullous keratopathy.

Subepithelial fluid-filled bullae form on the corneal surface as the corneal stroma (the deeper layers of the cornea) swells, leading to eye discomfort, decreased visual acuity, loss of contrast, glare, and photophobia. Sometimes bullae rupture, causing pain and foreign body sensation. Bacteria can invade a ruptured bulla, leading to a conical ulcer.

Methods of Treatment

In certain embodiments, a method of preventing or treating corneal associated diseases or disorders, comprising producing clinical-grade corneal endothelial cells (CECs) from human embryonic stem cells (hESCs) or peripheral blood mononuclear cell (PBMC)-originated, induced pluripotent stem cells (iPSCs) and transplanting the CECs in the cornea of a subject in need of some treatment. In certain embodiments, conical disease or disorder comprises inherited diseases or disorders, infection, wounds, inflammatory diseases, autoimmune diseases, dry eye, dystrophies or combinations thereof. In certain embodiments, conical disease or disorder comprises Fuchs endothelial conical dystrophy (FECD), keratoconus, keratoconjunctivitis sicca (KCS), iridocorneal endothelial syndrome (ICE), keratitis, corneal ulcers, corneal abrasion, or bullous keratopathy.

In certain embodiments, a composition comprises a therapeutically effective amount of corneal endothelial cells (CECs) produced from human embryonic stem cells (hESCs) or peripheral blood mononuclear cell (PBMC)-originated, induced pluripotent stem cells (iPSCs).

In certain embodiments, the compositions comprise a cell which has been infected with pluripotent factors for the generation of a therapeutically effective amount of corneal endothelial cells (CECs) from the peripheral blood mononuclear cell (PBMC)-originated, induced pluripotent stem cells (iPSCs) or human embryonic stem cells (hESCs). In embodiments, the methods of the invention are applied ex vivo. That is, a subject's cells can be removed from the body and treated with the compositions in culture to excise, and the treated cells returned to the subject's body. In some embodiments, the cells are human leukocyte antigen (HLA)-matched, autologous, cell lines, allogenic or combinations thereof.

When induced pluripotent stem cells (iPSCs) are used for the therapeutic treatment of diseases, it is desirable to use somatic cells isolated from patients. For example, somatic cells involved in diseases, somatic cells participating in the therapeutic treatment of diseases and the like can be used. Various media that can maintain undifferentiated state and pluripotency of human embryonic stem cells (hESCs) are known in this field, and iPSCs can be efficiently isolated by using a combination of appropriate media. Differentiation and proliferation abilities of isolated iPSCs and hESCs can be easily confirmed by those skilled in the art by using confirmation means widely applied to hESCs.

In certain embodiments, the peripheral blood mononuclear cell (PBMC)-originated, induced pluripotent stem cells (iPSCs) can include a population of stem cells like embryonic stem cells (ESCs). ESCs have been established from many animal species, including humans. These types of pluripotent stem cells are a useful source of cells for regenerative medicine because these cells are capable of differentiation into almost all of the organs by appropriate induction of their differentiation, with retaining their ability to actively dividing while maintaining their pluripotency.

In some aspects, the sample from which the cells are derived or isolated is blood or a blood-derived sample. In certain embodiments, the cells are derived from peripheral blood mononuclear cells (PBMCs). Samples include, in the context of cell therapy, e.g., adoptive cell therapy, samples from autologous and allogeneic sources.

In some embodiments, isolation of the cells includes one or more preparation and/or non-affinity based cell separation steps. In some examples, cells are washed, centrifuged, and/or incubated in the presence of one or more reagents, for example, to remove unwanted components, enrich for desired components, lyse or remove cells sensitive to particular reagents. In some examples, cells are separated based on one or more properties, such as density, adherent properties, size, sensitivity and/or resistance to particular components.

In some examples, the samples, contain lymphocytes, including T cells, monocytes, granulocytes, B cells, other nucleated white blood cells, red blood cells, and/or platelets, and in some aspects contains cells other than red blood cells and platelets.

In some embodiments, the blood cells collected from the subject are washed, e.g., to remove the plasma fraction and to place the cells in an appropriate buffer or media for subsequent processing steps. In some embodiments, the cells are washed with phosphate-buffered saline (PBS). In some embodiments, the wash solution lacks calcium and/or magnesium ($Ca^{++}/Mg^{++}$) and/or many or all divalent cations. In some embodiments, the cells are resuspended in a variety of biocompatible buffers after washing, such as, for example, $Ca^{++}/Mg^{++}$ free PBS. In certain embodiments, components of a blood cell sample are removed and the cells directly resuspended in culture media.

In some embodiments, the methods include density-based cell separation methods, such as the separation of white blood cells from peripheral blood by centrifugation through a Percoll or Ficoll gradient.

In some embodiments, the isolation methods include the separation of different cell types based on the expression or presence in the cell of one or more specific molecules, such as surface markers, e.g., surface proteins, intracellular markers, or nucleic acid. In some embodiments, any known method for separation based on such markers may be used. In some embodiments, the separation is affinity- or immunoaffinity-based separation. For example, the isolation in some aspects includes separation of cells and cell populations based on the cells' expression or expression level of one or more markers, typically cell surface markers, for example, by incubation with an antibody or binding partner that specifically binds to such markers, followed generally by washing steps and separation of cells having bound the antibody or binding partner, from those cells having not bound to the antibody or binding partner.

The separation need not result in 100% enrichment or removal of a particular cell population or cells expressing a particular marker. For example, positive selection or enrichment for cells of a particular type, such as those expressing a marker, refers to increasing the number or percentage of such cells, but need not result in a complete absence of cells not expressing the marker.

Once the conical endothelial cells (CECs) have been generated from the peripheral blood mononuclear cell (PBMC)-originated, induced pluripotent stem cells (iPSCs) or from human embryonic stem cells (hESCs), the cells transplanted into the cornea. The cells embodied herein, are prepared for transplantation according to established methods. After a period of about 3-4 weeks in culture, the cells will be cryopreserved. In this regard, the growth characteristics of cells vary from patient to patient and from cell type to cell type. About 72 hours prior to transplantation of the cells, an aliquot is taken for analysis of phenotype, and the percentage of cells expressing the corneal endothelium (CE)-associated markers. Administration can be accomplished via a single dose.

It will be understood, however, that the therapeutic amount of conical endothelial cells (CECs) and frequency of administration for any particular subject may be varied and will depend upon a variety of factors including the activity and viability of the specific cells employed, and the age, body weight, general health, sex, diet, mode and time of administration, rate of engraftment, drug combination, the severity of the particular condition, and the host undergoing therapy. In some embodiments, a therapeutically effective amount of CECs transplanted into a subject is an amount capable of engrafting such transplanted cells in the subject, whereby such cells ameliorate of the symptoms of the disease by eliciting the desired biological response.

For better clinical acceptance, all culture media used herein are preferably substantially xeno-free, substantially serum-free or defined, more preferably combinations of these and most preferably xeno-free, serum-free and defined at the same time. With substantially is meant here that unintentional traces are irrelevant and what is under clinical or laboratory regulations considered and accepted as xeno-free, serum-free or defined, applies here as well.

Kits

In certain embodiments, a kit comprising a pharmaceutical composition and a therapeutically effective amount of clinical-grade corneal endothelial cells (CECs) produced from the peripheral blood mononuclear cell (PBMC)-originated, induced pluripotent stem cells (iPSCs) or human embryonic stem cells (hESCs).

All citations to sequences, patents, and publications in this specification are herein incorporated by reference to the same extent as if each independent patent and publication was specifically and individually indicated to be incorporated by reference.

EXAMPLES

Example 1: Generation and Cryopreservation of Pluripotent Stem Cell-Derived Clinical-Grade Corneal Endothelial Cells Derivation and cryopreservation of clinical-grade corneal endothelial cells (CECs) from the peripheral blood mononuclear cell (PBMC)-originated, induced pluripotent stem cells (iPSCs) and human embryonic stem cells (hESCs) is reported herein. Characterization of the proteome of the iPSC-derived CECs under xenophilic conditions was accomplished through mass spectrometry-based protein sequencing and subsequently compared with the proteome of a human corneal endothelium (CE) specimen obtained from an Eye Bank. This analysis provides evidence that >90% of the proteins expressed in donor CE are present in iPSC-derived CECs. Likewise, characterization of transcriptomes of hESC- and iPSC-derived CECs under xenophilic conditions was completed through next-generation based RNA sequencing (RNA-Seq). Comparative transcriptome analysis of hESC- and iPSC-derived CECs revealed 13, 208 (>96%) genes common in both transcriptomes.

Materials and Methods

Subjects and clinical ascertainment. Institutional Review Board (IRB) approvals for research involving human subjects and pluripotent stem cells were obtained from the Johns Hopkins University School of Medicine, Baltimore MD. The control participating subject gave informed consent consistent with the tenets of the Declaration of Helsinki.

Isolation and cryopreservation of peripheral blood mononuclear cells (PBMCs). The PBMCs were isolated according to the procedure published by Agu and colleagues.[6] Briefly, 10 ml of human peripheral blood was collected in a 50 ml conical tube containing 0.5 M EDTA and two volumes of phosphate-buffered saline (PBS) was added. The mixture was gently layered on 15 ml of histopaque (Sigma, Newyork, NY) and centrifuged at 400 g for 30 minutes (without brakes).

The mononuclear cells layer was gently collected in a 50 ml tube, washed twice with phosphate-buffered saline (PBS) by centrifugation at 300 g for 10 minutes. The peripheral blood mononuclear cell (PBMC) pellet was cryopreserved in medium containing 10% dimethyl sulphoxide (DMSO; Sigma).

Human embryonic stem cells (hESCs). The H9 hESCs (WiCell Research Institute, Madison, WI, USA) were cultured in Essential 8 medium (Life Technologies) in feeder-free conditions on Vitronectin (VTN-N) coated plates. The cells were passaged using 0.5 mM EDTA every 4-5 days and the culture medium was changed daily.

Generation of induced pluripotent stem cells (iPSCs) using the Sendai-virus delivery system. The cryopreserved peripheral blood mononuclear cells (PBMCs) were reprogramed using Sendai-virus delivery system, according to the manufacturer's instructions (Life Technologies, Carlsbad, CA). Briefly, the PBMC vial was removed from liquid nitrogen and thawed at 37° C. in a water bath. Subsequently, the PBMCs were washed with StemSpan medium (Stemcell Technologies, Vancouver, Canada), and cultured in StemSpan medium supplemented with 100 ng/ml FMS-like tyrosine kinase 3 ligand (FLT-3L), 100 ng/ml stem cell factor (SCF), 20 ng/ml interleukin-3 (IL-3) and 20 ng/ml interleukin-6 (IL-6), termed complete medium hereafter, in a humidified incubator at 37° C. supplemented with 5% $CO_2$ for four days.

Approximately, $5 \times 10^5$ cells/ml peripheral blood mononuclear cells (PBMCs) were collected in a round bottom tube in 1 ml complete medium, followed by infection with reprogramming viral particles at a multiplicity of infection (MOI), of 5, 5, and 3 (KOS MOI=5, hc-Myc MOI=5, hKlf4 MOI=3). The infected cells were centrifuged at 1000 g for 30 minutes at room temperature. The cells were resuspended in 1 ml of complete medium, transferred to a single well of a 12-well plate and cultured for three days in complete medium. Subsequently, the cells were transferred to HEF (human embryonic fibroblasts) coated plates for three days with complete medium, and finally transferred to Dulbecco's Modified Eagle's Medium (DMEM)/F-12 medium supplemented with 20% knockout serum replacement (KSR; Life Technologies, Carlsbad, CA) and 20 ng/ml basic fibroblast growth factor (bFGF; Life Technologies, Carlsbad, CA) until embryonic stem cell-like colonies were formed. Embryonic stem cell-like, putative iPSC colonies were selected and cultured on Vitronectin coated plate in Essential 8 medium for characterization.

Phase contrast microscopy. Phase contrast microscopy was performed using a Zeiss Axio Observer A1 inverted microscope (Zeiss, Germany) equipped with Q-Capture software (QImaging, Surrey, Canada).

Characterization of induced pluripotent stem cells (iPSCs) by flow cytometry. The peripheral blood mononuclear cell (PBMC)-originated, iPSCs were characterized by flow cytometry. Approximately, $2 \times 10^5$ cells were labeled with SSEA4 and TRA-1-60 (Cell signaling technology, Danvers, MA) primary antibodies for one hour at 4° C. followed by treatment with FITC-conjugated goat anti-mouse IgG antibody (against SSEA4, and TRA-1-60; Millipore, Billerica, MA) for 40 minutes at 4° C. A total of 10,000 events were acquired for each sample using a guava easyCyte flow cytometer (Millipore BDScience, Billerica MA).

Characterization of induced pluripotent stem cells (iPSCs) by quantitative real-time polymerase chain reaction (qRT-PCR). The total RNA from H9 human embryonic stem cells (hESCs) and peripheral blood mononuclear cell (PBMC)-originated, iPSCs was extracted using TRIzol reagent (Invitrogen; Carlsbad, CA) according to the manufacturer's instructions. The RNA was quantitated on a NanoDrop Lite Spectrophotometer (Thermo Scientific, Waltham, MA). First-strand cDNA was synthesized using the Superscript III kit (Invitrogen) according to the manufacturer's instructions.

Quantitative real-time polymerase chain reaction (qRT-PCR) was performed on the STEP ONE ABI Real-Time PCR System. The expression of pluripotent markers (NANOG, OCT4, SOX2, and TRA-1-60), were quantitated using Power SYBR Green PCR Master Mix (Life Technologies). Glyceraldehyde-3-phosphate dehydrogenase (GAPDH) was used as endogenous control. The delta-delta Ct method was used to determine the relative expression, normalized against GAPDH as reported previously.[7, 8] All the primers used in the qRT-PCR analysis were designed using Real-time PCR tool (Integrated DNA Technologies).

Differentiation of induced pluripotent stem cells (iPSCs) and human embryonic stem cells (hESCs) into corneal endothelial cells (CECs). Peripheral blood mononuclear cell (PBMC)-originated, iPSCs and hESCs were used to generate CECs by modifying previously published procedure.[9] Briefly, iPSCs and hESCs were seeded on 35 mm Vitronectin-coated plates (Thermo Fisher Scientific) in 1:7 dilution (70% confluent plate was split into 7 plates) on day 0 using 0.5 mM EDTA (Life Technologies). The iPSCs and hESCs were grown for four days in Essential 8 medium (Life Technologies). On day 4, Essential 8 media was replaced with dual Smad inhibitors media containing 500 ng/ml human recombinant Noggin (R&D Systems, Minneapolis, MN) and 10 μM SB431542 (MilliporeSigma) in a basal media of 80% Dulbecco's Modified Eagle's Medium (DMEM)/F-12 medium (Life Technologies), 20% knockout serum replacement (KSR; Life Technologies), 1% non-essential amino acids (Life Technologies), 1 mM L-glutamine (Life Technologies), 0.1 mM β-mercaptoethanol (Life Technologies), and 8 ng/ml basic fibroblast growth factor (bFGF; R&D Systems).

On day 6, dual Smad inhibitors media was replaced by cornea medium containing 0.1X B27 supplement (Life Technologies), 10 ng/ml recombinant human platelet-derived growth factor-BB (PDGF-BB; R&D Systems), and 10 ng/ml recombinant human Dickkopf related protein-2 (Dkk-2; R&D Systems) in a basal media of 80% Dulbecco's Modified Eagle's Medium (DMEM)/F-12 medium (Life Technologies), 20% knockout serum replacement (KSR; Life Technologies), 1% non-essential amino acids (Life Technologies), 1 mM L-glutamine (Life Technologies), 0.1 mM β-mercaptoethanol (Life Technologies), and 8 ng/ml bFGF (R&D Systems). On day 7, the differentiating corneal endothelial cells (CECs) were transferred to new Vitronectin-coated plates (35 mm) and were grown in cornea medium for 13 additional days.

Characterization of human embryonic stem cell (hESC)- and induced pluripotent stem cell (iPSC)-derived corneal endothelial cells (CECs) by quantitative real-time PCR (qRT-PCR). The total RNA from H9 hESCs, iPSCs and differentiating CECs at day 20 was extracted using TRIzol reagent (Invitrogen). The first-strand cDNA was synthesized using the Superscript III kit (Invitrogen) as described above. The expression of pluripotent markers (NANOG, OCT4, SOX2, and TRA-1-60) and corneal endothelium (CE)-associated markers (AQP1, COL4A1, COL4A3, COL8A1, COL8A2, FOXC1, and SLC16A3) were quantitated using qRT-PCR as described above. The primers were designed using the Real-time PCR tool (Integrated DNA Technologies) and are available upon request.

Characterization of human embryonic stem cell (hESC)- and induced pluripotent stem cell (iPSC)-derived corneal endothelial cells (CECs) by immunocytochemistry. The hESC- and iPSC-derived CECs were also analyzed by immunocytochemistry. Briefly, the cells were fixed with 4% paraformaldehyde (PFA) for 15 minutes followed by blocking with 5% bovine serum albumin (BSA; Sigma). The cells were first incubated with zona occludens-1 (ZO1, Cell Signaling Technology) and N-cadherin (Cell Signaling Technology) primary antibodies overnight at 4° C. The cells were next treated with FITC conjugated goat anti-Rabbit IgG (against ZO1; MilliporeSigma) and FITC conjugated goat anti-Mouse IgG (against N-Cadherin; MilliporeSigma) secondary antibodies for two hours at room temperature. The nuclei were counterstained with 4',6-Diamidine-2'-phenylindole dihydrochloride (DAPI). The images of mounted cells were captured using an Olympus LX81 microscope (Olympus, Tokyo, Japan) equipped with Slidebook Software (3i Denver, Colo.) and prepared using Adobe Photoshop CS5.

Cryopreservation of human embryonic stem cell (hESC)- and induced pluripotent stem cell (iPSC)-derived corneal endothelial cells (CECs) and their characterization. The differentiated CECs at day 20 were detached using cell dissociation buffer (Life Technologies) and re-suspended and cryopreserved in CryoStor cell cryopreservation media. The cryopreserved hESC- and iPSC-derived CECs were cultured a week later and maintained in cornea medium until they reached confluence. The expression of corneal endothelium (CE)-associated markers (AQP1, ATP1A1, ATP1A3, COL4A1, COL4A3, COL8A1, COL8A2, FOXC1, and SLC16A3) was quantitated using quantitative real-time PCR (qRT-PCR) as described above. The hESC- and iPSC-derived CECs were also characterized by immunocytochemistry for the expression of tight junction protein (ZO-1), N-cadherin and CE pump function protein ($Na^+/K^+$ ATPase α1) as described above.

RNA-Seq analysis of non-cryopreserved and cryopreserved hESC-derived CECs. Next-generation based RNA-Seq analysis of hESC-derived CECs at day 20 (non-cryopreserved) and cryopreserved hESC-derived CECs (cryopreserved for 40 days in liquid nitrogen) was performed. Briefly, three biological replicates for each of non-cryopreserved hESC-derived CECs and cryopreserved hESC-derived CECs were used for RNA-Seq library preparation. Total RNA was isolated from each sample using TRIzol reagent (Invitrogen). The extracted RNA was examined using a NanoDrop Lite spectrophotometer (Thermo Fisher Scientific) and RNA 6000 Pico kit on an Agilent 2100 Bioanalyzer (Agilent; Palo Alto, CA).

Total RNA was subjected to RNA-Seq library preparation using NEBNext Ultra II RNA Library Prep Kit for Illumina (New England Biolabs, Ipswich, MA). Approximately, 1.0 μg of high-quality total RNA (≥8.0 RIN Score) was used for polyadenylated RNA selection using oligo dT beads, followed by the fragmentation of selected polyadenylated RNA. The fragmented RNA was used as a template for cDNA synthesis by reverse transcriptase with random primers. The cDNA was further converted into double-stranded DNA that was end-repaired to incorporate the specific index adapters for multiplexing, followed by a purification step and amplification for 15 cycles. The amplified libraries were examined on an Agilent 2100 Bioanalyzer (Agilent) and quantitative PCR (qPCR) according to the manufacturer's instructions.

RNA-Seq libraries with unique index sequences were pooled in an equimolar ratio, and a final size selection of 400-500 bp was performed. After the quality control confirmation, three RNA-Seq bar-coded pooled libraries were sequenced (2×100 bp) in a single lane on a HiSeq 2500 (rapid run mode) genome analyzer. The base calls were assigned through the Illumina real-time analysis (RTA) software (version 1.17.20) and base call files were converted from a binary format (BCL) to flat-file format (qseq.txt) using Illumina BCL converter software (Ver. 1.9.4). Qseq.txt files were de-multiplexed to single sample FASTQ files using de-multiplexer software.

The raw RNA-Seq reads (FASTQ) were processed and analyzed using Lasergene Genomics Suite (DNASTAR, Madison, WI, USA). The paired-end reads were assembled with SeqMan NGen (Ver. 12), using default parameters and aligned to the human reference genome (GRCh38.p11). The ArrayStar (Ver, 12; DNASTAR) was used for normalization, differential gene expression and statistical analysis of mapped paired-end reads using the default parameters. FPKM were used for normalization and quantification of gene expression.[30] Differential expression of non-cryopreserved hESC-derived CECs and cryopreserved hESC-derived CECs was estimated using Spotfire DecisionSite with Functional Genomics (TIBCO Spotfire, Boston, MA). We chose >2 standard deviations (Std. Dev.) from the mean of 0 that represents no change, as the cutoff value.

Injection of cryopreserved human embryonic stem cell (hESC)-derived corneal endothelial cells (CECs) into the anterior chamber of Rabbits. For injection of cryopreserved hESC-derived CECs, rabbits were anesthetized using acepromazine (subcutaneous), dexmedetomidine (intramuscular) and ketamine (intramuscular). The rabbits were also given buprenorphine (subcutaneous), dexamethasone (intramuscular) and kenalog-40 (intramuscular) to inhibit pain, inflammation and immunologic reaction. Tracheal intubation was performed to inhale isoflurane and oxygen mixture during the surgical procedure for keeping the rabbit unconscious. Rabbits were also injected lactated ringers solution at a rate of 15 ml per hour in the right ear using 22 gauge catheter during the entire surgical procedure. Pupils were dilated using a 2.5% phenylephrine solution and 1% tropicamide solution.

Following the application of 0.5% proparacaine hydrochloride ophthalmic solution, a 1.6 mm incision was introduced at the border zone of the 8 mm central corneal epithelial surface mark. A 20 gauge silicone needle was used to remove the resident CECs in an 8 mm diameter area of the central cornea. A 30 gauge cannula was used to irrigate the anterior chamber to remove the cell debris from the anterior chamber. A 28 gauge needle was employed to inject $7.5 \times 10^5$ cryopreserved hESC-derived CECs in 200 µl of DMEM/F12 medium supplemented with 10004 ROCK inhibitor Y-27632 into the anterior chamber. The incision was closed by three interrupted sutures (Nylon 10-0). Following cell injection, rabbits were also administered Tobradex ophthalmic ointment topically to inhibit inflammation and immunologic reaction. The rabbits were then placed in an eye-down position for 3 hours to enhance the adhesion of the injected cells.

Subsequent to the settlement of cells for 3 hours, the middle suture was removed and the anterior chamber was washed twice with sterile BSS. The anterior chamber was then reconstituted with BSS and incision was closed using one interrupted suture (Nylon 10-0). Tobradex ophthalmic ointment was applied three times a day for 10 days post-injection. In the preliminary experiments, we confirmed that the Descemets membrane was intact using OCT and H&E staining and the mechanically scraped area were devoid of cells on the Descemets membrane. The injection model rabbits were kept for 9 months post-injection and then sacrificed for subsequent analyses.

Clinical evaluations of rabbit eyes. The clinical evaluation of the post-operative eyes and control eyes was performed by evaluating intraocular pressure (IOP), corneal thickness and CEC density using Tono-Pen, ultrasonic pachymeter, and confoscan4 scanning microscope respectively at different time points in rabbits. The photographs of the injected corneas were taken at different time points.

Histological evaluation of rabbit eyes. Rabbits (injection and injury-injection models) were sacrificed by an intravenous injection of euthanasia solution nine months post-injection. Postoperative and control eyes were removed and fixed in 10% formalin and subjected to H&E and immunofluorescent staining. For H&E staining, following deparaffinization and hydration, hematoxylin was applied to the sections to stain the nuclei. Subsequently, the sections were counterstained with eosin, followed by dehydration and mounting.

For immunohistological analysis, after deparaffinization, hydration and antigen retrieval, the sections were blocked with 5% bovine serum albumin (MilliporeSigma) for 45 minutes at room temperature. The sections were first incubated with 1:300 ZO-1 (MilliporeSigma), 1:100 $Na^+/K^+$ ATPase α1 (Thermo Fisher Scientific) and 1:250 N-cadherin (Thermo Fisher Scientific) primary antibodies overnight at 4° C. The sections were next treated with 1:100 FITC-conjugated goat anti-mouse IgG (against ZO-1; MilliporeSigma), 1:200 Alexa Fluor 647 donkey anti-mouse IgG (against $Na^+/K^+$ ATPase α1; Thermo Fisher Scientific) and 1:100 FITC-conjugated goat anti-mouse IgG (against N-cadherin; MilliporeSigma) secondary antibodies for 2 hours at room temperature. The nuclei were counterstained with DAPI (MilliporeSigma).

The images of mounted sections were captured per five random fields from the injected area of at least two sections from each eye using a microscope (Olympus LX81; Olympus, Tokyo, Japan) equipped with software (Slidebook Software 3i; Denver, CO, USA) and prepared using image editing software (Adobe Photoshop CS5; Adobe Systems, Inc., San Jose, CA, USA).

Injection of cryopreserved human embryonic stem cell (hESC)-derived corneal endothelial cells (CECs) into the anterior chamber of monkeys. In the non-human primate study, monkeys were used to evaluate the efficacy of cryopreserved hESC-derived CECs injection to form functional CE monolayer. For the monkey injection model, monkeys were anesthetized and intubated using the same procedure performed in the rabbit injection model.

Following the preparation of the macaque corneal endothelial dysfunction model according to the procedure performed in the rabbit injection model above, a 28-gauge needle was employed to inject $1 \times 10^6$ CECs suspended in 250 µl of DMEM/F12 medium supplemented with 100 µM ROCK inhibitor Y-27632 into the anterior chamber. The incision was closed by three interrupted sutures (Nylon 10-0). The remaining procedure was the same as performed in the rabbit injection model except for the application of Tobradex ophthalmic ointment and kenalog-40 (to inhibit immunologic rejection) that were administered every alternate day for 12 days post-injection using dexmedetomidine and ketamine sedatives.

The injection model monkeys were kept for 1-year post-injection and then sacrificed for subsequent analyses. For the monkey injury-injection model, monkeys were anesthetized and subjected to corneal endothelial injury as performed earlier in the rabbit injury-injection model. The anterior chamber was reconstituted with sterile BSS and incision was closed using 10-0 Nylon suture. The monkeys were kept for 2 days following corneal endothelial injury with the topical application of Tobradex ophthalmic ointment three times a day and then subjected to cryopreserved hESC-derived CECs injection using the same procedure performed in macaque injection model. The injury-injection model monkeys are currently alive (at 3 months post-injection) and we have planned to keep two macaques for follow up study for at least two years post-injection to further rule out any late-stage offside effect of injected cryopreserved hESC-derived CECs.

Clinical evaluations of monkey eyes. The clinical evaluation of the post-operative eyes and control eyes was performed by evaluating IOP, corneal thickness and CEC density using Tono-Pen, ultrasonic pachymeter, and confoscan4 scanning microscope respectively at different time points in monkeys. The photographs of the injected corneas were taken at different time points.

Histological evaluation of monkey eyes. Monkeys were sedated using dexmedetomidine and ketamine and sacrificed by an intravenous injection of euthanasia solution 1 year post-injection. Postoperative and control eyes were removed and fixed in 10% formalin and subjected to H&E staining using the same procedure performed in rabbits. For immunofluorescent staining, the sections were first incubated with 1:200 ZO-1 (MilliporeSigma), 1:100 $Na^+/K^+$ ATPase α1 (Thermo Fisher Scientific) and 1:250 N-cadherin (Thermo Fisher Scientific) primary antibodies overnight at 4° C. The sections were next treated with 1:200 Alexa Fluor 647 donkey anti-mouse IgG (against ZO-1, $Na^+/K^+$ ATPase α1, and N-cadherin; Thermo Fisher Scientific) secondary antibodies for 2 hours at room temperature. The nuclei were counterstained with DAPI (MilliporeSigma). The images of mounted sections were captured using the same procedure performed in rabbits.

Necropsy and CBC/blood chemistry examination. At the completion of the study, rabbits and macaques were subjected to a detailed necropsy and CBC/blood chemistry examination. The following tissues were examined: eyes, brain, abdominal and thoracic viscera, kidneys, heart, liver, gastrointestinal tract, spleen, pituitary glands, femur with bone marrow, urinary bladder, coxofemoral, femorotibial, atlanto occipital joints, and testes.

Results

Generation and validation of human induced pluripotent stem cells (iPSCs). A 10 ml blood aliquot was obtained from a healthy 67-year old male with no history of corneal endothelial dystrophy. Peripheral blood mononuclear cells (PBMCs) were isolated from a 10 ml blood aliquot by density gradient centrifugation and preserved in liquid nitrogen until further use. The PBMCs were reprogrammed with integration-free Sendai virus gene delivery method by expressing pluripotent factors (c-MYC, KLF4, OCT3/4, and SOX2) according to the manufacturer's instructions. Embryonic stem cell-like, putative iPSC colonies were selected and expanded for characterization. The iPSC colonies were evaluated for the expression of pluripotent markers, which revealed expression levels of pluripotent markers i.e. NANOG, OCT4, SOX2 and TRA-1-60 by quantitative real-time PCR (qRT-PCR) in PBMC-originated, iPSCs comparable to human embryonic stem cells (hESCs). The PBMC-originated, iPSCs were also assessed for the protein expression of pluripotent markers (SSEA4 and TRA-1-60) by flow cytometry. The flow cytometry analysis demonstrated that PBMC-originated, iPSCs were highly positive for SSEA4 and TRA-1-60 (data not shown).

Differentiation of human embryonic stem cells (hESCs) and induced pluripotent stem cells (iPSCs) into corneal endothelial cells (CECs). McCabe and colleagues reported the generation of CECs from hESCs.[9] Our group recently reported generation and proteome profiling of CECs from peripheral blood mononuclear cell PBMC-originated, iPSCs and comparative transcriptome analysis of hESC- and iPSC-derived CECs.[10, 11] This procedure is based on the differentiation of multipotent neural crest cells (NCCs) into CECs. A 20-day procedure was adopted, modifying the protocol reported by Ali and colleagues to generate PBMC-originated, iPSC- and hESC-derived CECs.[10, 11] The differentiation process was initially characterized by examining the morphology of the differentiating CECs. On day 7, the prospective CECs were treated with cell dissociation buffer and transferred to a new Vitronectin-coated plate. It was observed that a transfer to a new Vitronectin plate on day 7 resulted in the differentiation of iPSCs and hESCs into CECs. The morphological examination on day 20 revealed that hexagonal/polygonal CECs were tightly packed (FIG. 1).

Gene expression and immunocytochemical analyses of differentiating corneal endothelial cells (CECs). To confirm the cardinal features of CECs, we performed quantitative real-time PCR (qRT-PCR) analysis for pluripotent and corneal endothelium (CE)-associated markers at different time points during the differentiation procedure. We investigated the expression of the pluripotent markers (mentioned above) and CE-associated markers i.e. AQP1, COL4A1, COL4A3, COL8A1, COL8A2, FOXC1, and SLC16A3 at day 4 and day 20 during differentiation of human embryonic stem cells (hESCs) and induced pluripotent stem cells (iPSCs) into CECs. On day 20, the CECs express AQP1, COL4A3, COL8A2, and SLC16A3, indicative of CECs maturation. The expression of tight junction protein (ZO-1) and N-cadherin at the cell boundaries of hESC- and iPSC-derived CECs illustrated hexagonal/polygonal-like cells confirm the structural integrity of hESC- and iPSC-derived CECs.

Validation of cryopreserved human embryonic stem cells (hESC)- and induced pluripotent stem cells (iPSC)-derived corneal endothelial cells (CECs) by quantitative real-time PCR (qRT-PCR) and immunocytochemistry. The differentiated CECs at day 20 were cryopreserved in liquid nitrogen and a week later, the CECs were revived and cultured until they reached confluence. The effect of cryopreservation was first evaluated by phase contrast microscopy. The cryopreserved CECs were tightly adherent having a hexagonal/polygonal shape (data not shown), suggesting that cryopreservation does not affect the morphology of hESC- and iPSC-derived CECs. It is worth noting that the seeding density of cryopreserved CECs is critical; plating of CECs at low-density results in fibroblasts-like morphology as CECs expand into the open space.

Next, the expression of conical endothelium (CE)-associated markers was investigated by quantitative real-time PCR (qRT-PCR). The qRT-PCR analysis revealed similar expression levels of the corneal endothelium (CE)-associated markers before and after cryopreservation (data not are shown), further supporting the notion that cryopreservation does not affect the expression of CE-associated markers in human embryonic stem cell (hESC)- and induced pluripotent stem cell (iPSC)-derived corneal endothelial cells (CECs). Finally, the expression of tight junction protein (ZO-1), N-cadherin and CE pump function protein ($Na^+/K^+$ ATPase $\alpha1$) was examined by immunocytochemical analysis. The immunostaining of ZO-1, N-cadherin, and $Na^+/K^+$ ATPase $\alpha1$ at the cell boundaries of cryopreserved hESC- and iPSC-derived CECs illustrating hexagonal/polygonal-like cells confirm the structural integrity of hESC- and iPSC-derived CECs following cryopreservation (data not shown).

Necropsy and CBC/blood chemistry examination. The detailed necropsy examination of eyes, brain, abdominal and thoracic viscera, kidneys, heart, liver, gastrointestinal tract, spleen, pituitary glands, urinary bladder, testes and femur with bone marrow were unremarkable. No abnormal mass was observed in the detailed necropsy study. All the CBC/blood chemistry parameters were within the normal physiological range.

Discussion

Herein, the derivation of clinical-grade corneal endothelial cell (CEC)-like cells from human embryonic stem cells (hESCs) and peripheral blood mononuclear cell (PBMC)-originated, induced pluripotent stem cells (iPSCs) under xeno-free conditions is reported and the effects of cryopreservation were examined on hESC- and iPSC-derived CECs, which suggested that cryopreservation does not affect the structural integrity of the hESC- and iPSC-derived CECs. Previously, our group reported generation and proteome profiling of PBMC-originated, iPSC-derived CECs and comparative transcriptome analysis of hESC- and iPSC-derived CECs.

A 20-day procedure was adopted, modifying the protocol reported by Ali and colleagues.[10, 11] The high expression of corneal endothelium (CE)-associated markers and more importantly, the lack of expression of pluripotency markers strongly support the differentiation of human embryonic stem cells (hESCs) and induced pluripotent stem cells (iPSCs) into corneal endothelial cell (CEC) lineage.

A major safety concern regarding the use of cryopreserved hESC-derived CECs is the possibility for the persistence of undifferentiated hESCs through the differentiation process. We, therefore, examined detailed CBC/blood chemistry profile and multiple organs of injected rabbits (9 months post-injection) and injected monkeys 1-year post-injection. All the CBC/blood chemistry parameters were within normal physiological range and no abnormality was observed in any body organ as evident by necropsy examination.

To the best of the inventors' knowledge, this is the first report of generation and cryopreservation of clinical-grade human embryonic stem cell (hESC)- and peripheral blood originated, induced pluripotent stem cell (iPSC)-derived corneal endothelial cells (CECs).

REFERENCES

1. Delmonte D W, Kim T. Anatomy and physiology of the cornea. *J Cataract Refract Surg.* 2011; 37:588-598.
2. Bonanno J A. Molecular mechanisms underlying the corneal endothelial pump. *Exp Eye Res.* 2012; 95:2-7.
3. Claerhout I, Beele H, Kestelyn P. Graft failure: I. Endothelial cell loss. *Int Ophthalmol.* 2008; 28:165-173.
4. Eye Bank Association of America. 2016 Eye banking Statistical Report. In: 2016.
5. Gain P, Jullienne R, He Z, Aldossary M, Acquart S, Cognasse F, Thuret G. Global Survey of Corneal Transplantation and Eye Banking. *JAMA Ophthalmol.* 2016; 134:167-173.
6. Agu C A, Soares F A, Alderton A, Patel M, Ansari R, Patel S, Forrest S, Yang F, Lineham J, et al. Successful Generation of Human Induced Pluripotent Stem Cell Lines from Blood Samples Held at Room Temperature for up to 48 hr. *Stem Cell Reports.* 2015; 5:660-671.
7. Livak K J, Schmittgen T D. Analysis of relative gene expression data using real-time quantitative PCR and the 2(-Delta Delta C(T)) Method. *Methods.* 2001; 25:402-408.
8. Khan S Y, Vasanth S, Kabir F, Gottsch J D, Khan A O, Chaerkady R, Lee M C, Leitch C C, Ma Z, et al. FOXE3 contributes to Peters anomaly through transcriptional regulation of an autophagy-associated protein termed DNAJB1. *Nat Commun.* 2016; 7:10953.
9. McCabe K L, Kunzevitzky N J, Chiswell B P, Xia X, Goldberg J L, Lanza R. Efficient Generation of Human Embryonic Stem Cell-Derived Corneal Endothelial Cells by Directed Differentiation. *PLoS One.* 2015; 10:e0145266.
10. Ali M, Khan S Y, Vasanth S, Ahmed M R, Chen R, Na C H, Thomson J J, Qiu C, Gottsch J D, et al. Generation and Proteome Profiling of PBMC-Originated, iPSC-Derived Corneal Endothelial Cells. *Invest Ophthalmol Vis Sci.* 2018; 59:2437-2444.
11. Ali M, Khan S Y, Kabir F, Gottsch J D, Riazuddin S A. Comparative transcriptome analysis of hESC- and iPSC-derived corneal endothelial cells. *Exp Eye Res.* 2018.

EQUIVALENTS

Those skilled in the art will recognize or be able to ascertain using no more than routine experimentation, many equivalents to the specific embodiments of the invention described herein. Such equivalents are intended to be encompassed by the following claims.

What is claimed:
1. A method of producing clinical-grade corneal endothelial cells (CECs) comprising:
   i) isolating peripheral blood mononuclear cells (PBMCs) from a subject,
   ii) reprogramming of the PBMCs to produce peripheral blood mononuclear cell (PBMC)-originated, induced pluripotent stem cells (iPSCs),
   iii) differentiating the peripheral blood mononuclear cell (PBMC)-originated, induced pluripotent stem cells (iPSCs), by culturing the iPSCs on human protein and cell culture medium,
   iv) replacing the cell culture medium with a differentiation medium, to produce differentiating corneal endothelial cells (CECs),
   v) transferring the differentiating CECs to human protein-coated plates comprising a cornea cell culturing medium,
   whereby steps i)-iv) produce clinical-grade corneal endothelial cells (CECs) in about 20 days or less.
2. The method of claim 1, wherein the differentiation media comprises one or more growth factors, inhibitors of transforming growth factor (TGF) or combinations thereof.
3. The method of claim 1, wherein the iPSCs cells expressing pluripotent markers are cultured in a protein or gelatinous protein mixture with one or more factors to induce differentiation of the cells.
4. The method of claim 3, wherein the cells cultured in the gelatinous protein mixture differentiate into corneal endothelial cells (CECs) as determined by the expression of corneal endothelium (CE)-associated markers or combinations thereof.
5. The method of claim 1, wherein upon cryopreservation of the cryopreserved clinical-grade corneal endothelial cells (CECs), the cryopreserved CECs retain their viability and/or function when thawed.
6. The method of claim 1 wherein peripheral blood mononuclear cell (PBMC)-originated, induced pluripotent stem cells (iPSCs) are differentiated into clinical-grade corneal endothelial cells (CECs).
7. The method of claim 1, wherein the differentiating corneal endothelial cells (CECs) are replated on a culture dish comprising human protein and cornea medium.
8. The method of claim 1, wherein the iPSCs are cultured a differentiation medium for about 1-3 days.
9. The method of claim 7, wherein the differentiating corneal endothelial cells (CECs) are cultured on new plates comprising human protein and cornea medium for about 7-14 days.
10. A method of producing clinical-grade corneal endothelial cells (CECs), the method consisting of:
   i) isolating peripheral blood mononuclear cells (PBMCs) from a subject,
   ii) reprogramming of the PBMCs to produce induced pluripotent stem cells (iPSCs),
   iii differentiating peripheral blood mononuclear cell (PBMC)-originated, induced pluripotent stem cells (iPSCs),
   iv) culturing the differentiating iPSCs,
   v) replacing the cell culture medium with a differentiation medium, to produce differentiating corneal endothelial cells (CECs),
   thereby producing clinical-grade corneal endothelial cells (CECs).
11. The method of claim 1, wherein the step of differentiating peripheral blood mononuclear cell (PBMC)-originated, induced pluripotent stem cells (iPSCs) comprises culturing the iPSCs on human protein and cell culture medium for about 3-6 days.
12. The method of claim 1, wherein the culture medium comprising one or more inhibitors of cell signaling pathways is replaced with cornea medium after about 2-4 days.

13. The method of claim 12, wherein the cornea medium comprises human growth factors, and B27 supplements.

14. The method of claim 12, wherein the differentiating CECs are transferred to a new human protein coated plate comprising cornea medium.

15. The method of claim 14, wherein the differentiating CECs are cultured for about 10 to 15 days.

16. The method of claim 1, wherein purification of differentiating cells is not required.

17. The method of claim 1, wherein the iPSCs are cultured on human protein and cell culture medium for a period exceeding 1 day prior to culture in media comprising one or more inhibitors of cell signaling pathways.

18. The method of claim 1, wherein the iPSCs are cultured on human protein and cell culture medium for a period of about 4 days prior to culture in media comprising one or more inhibitors of cell signaling pathways.

19. The method of claim 10, wherein the iPSCs are cultured on human protein and cell culture medium for a period exceeding 1 day prior to culture in media comprising dual Smad inhibitors.

20. The method of claim 10, wherein the iPSCs are cultured on human protein and cell culture medium for a period of about 4 days prior to culture in media comprising dual Smad inhibitors.

* * * * *